United States Patent
Shapiro

(10) Patent No.: US 10,849,035 B2
(45) Date of Patent: Nov. 24, 2020

(54) SHARING OF CONTEXT AMONG BASE STATION NODES FOR MOBILITY MANAGEMENT IN MOBILE COMMUNICATIONS NETWORK

(71) Applicant: EMC IP Holding Company LLC, Hopkinton, MA (US)

(72) Inventor: Dany Shapiro, Alfi Menashe (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 81 days.

(21) Appl. No.: 16/046,260

(22) Filed: Jul. 26, 2018

(65) Prior Publication Data
US 2020/0037217 A1    Jan. 30, 2020

(51) Int. Cl.
*H04W 36/00* (2009.01)
*H04W 36/08* (2009.01)
*H04W 76/15* (2018.01)
*H04W 8/08* (2009.01)
*H04W 36/30* (2009.01)
*H04W 92/20* (2009.01)

(52) U.S. Cl.
CPC ............ *H04W 36/08* (2013.01); *H04W 8/08* (2013.01); *H04W 36/30* (2013.01); *H04W 76/15* (2018.02); *H04W 92/20* (2013.01)

(58) Field of Classification Search
CPC ....... H04W 36/08; H04W 76/15; H04W 8/08; H04W 36/30; H04W 92/20
USPC ............... 455/436, 437, 442, 509, 502, 428
See application file for complete search history.

(56) References Cited

U.S. PATENT DOCUMENTS

2006/0116118 A1* 6/2006 Charriere .............. H04W 36/30
  455/423
2009/0040982 A1    2/2009 Ho et al.
(Continued)

OTHER PUBLICATIONS

M. Fathallah et al., "A Synchronizing Second Order Sliding Mode Control Applied to Decentralized Time Delayed Multi-Agent Robotic Systems: Stability Proof," Advances in Science, Technology and Engineering Systems (ASTES) Journal, Apr. 2017, pp. 160-170, vol. 2, No. 3.
(Continued)

*Primary Examiner* — Marceau Milord
(74) *Attorney, Agent, or Firm* — Ryan, Mason & Lewis, LLP

(57) ABSTRACT

Systems and methods are provided for sharing context of a mobile device among base station nodes for mobility management in mobile communications networks. An active connection is established between a first base station node and a mobile device, within radio access network of a mobile communications network. Other base station nodes in the radio access network within a tracking area of the mobile device are identified, and a state propagation process is performed to share a state of the active connection between the first base station node and the mobile device with at least a second base station node determined to be within the tracking area of the mobile device. The shared state is utilized to enable the mobile device to seamlessly establish an active connection with the second base station node and communicate with the mobile communications network through the active connection with the second base station node.

20 Claims, 9 Drawing Sheets

(56) References Cited

U.S. PATENT DOCUMENTS

| | | | |
|---|---|---|---|
| 2013/0039287 A1* | 2/2013 | Rayavarapu | H04W 76/28 370/329 |
| 2013/0155948 A1 | 6/2013 | Pinheiro et al. | |
| 2013/0260810 A1* | 10/2013 | Rayavarapu | H04W 76/19 455/509 |
| 2014/0153546 A1* | 6/2014 | Kim | H04W 48/18 370/332 |
| 2014/0355463 A1* | 12/2014 | Smith | H04M 15/60 370/252 |
| 2015/0038180 A1* | 2/2015 | Quick, Jr. | H04W 64/00 455/458 |
| 2015/0163767 A1* | 6/2015 | Shaw | G01S 5/0263 455/456.1 |
| 2016/0135247 A1 | 5/2016 | Ozturk et al. | |
| 2016/0286600 A1* | 9/2016 | Faccin | H04W 48/18 |
| 2016/0309379 A1* | 10/2016 | Pelletier | H04W 76/27 |
| 2016/0381662 A1* | 12/2016 | Wang | H04W 12/00 370/329 |
| 2017/0055187 A1 | 2/2017 | Kang et al. | |
| 2017/0331670 A1 | 11/2017 | Parkvall et al. | |
| 2018/0234941 A1* | 8/2018 | Kim | H04W 68/005 |
| 2019/0059046 A1* | 2/2019 | Virtej | H04L 5/005 |
| 2019/0069210 A1* | 2/2019 | Lee | H04W 36/0061 |
| 2019/0124561 A1* | 4/2019 | Faccin | H04W 76/16 |
| 2019/0289570 A1* | 9/2019 | Kim | H04W 76/27 |
| 2020/0092842 A1* | 3/2020 | Kim | H04W 76/27 |

OTHER PUBLICATIONS

Bart Barton, "LTE and Beyond: X2-Based Handover without SGW Relocation," http://www.lteandbeyond.com/2012/03/x2-based-handover-without-sgw.html, Mar. 16, 2012, 4 pages.

3GPP, "3rd Generation Partnership Project; Technical Specification Group Core Network and Terminals; Non-Access-Stratum (NAS) Protocol for Evolved Packet System (EPS); Stage 3 (Release 15)," 3GPP TS 24.301 V15.3.0, Jun. 2018, 528 pages.

3GPP, "3rd Generation Partnership Project; Technical Specification Group Core Network and Terminals; General Packet Radio System (GPRS) Tunnelling Protocol User Plane (GTPv1-U) (Release 11)," 3GPP TS 29.281 V11.6.0, Mar. 2013, 27 pages.

3GPP, "3rd Generation Partnership Project; Technical Specification Group Radio Access Network; Evolved Universal Terrestrial Radio Access (E-UTRA); Packet Data Convergence Protocol (PDCP) Specification (Release 11)," 3GPP TS 36.323 V11.2.0, Mar. 2013, 27 pages.

Alcatel-Lucent, "The LTE Network Architecture—A Comprehensive Tutorial," Strategic White Paper, 2009, 26 pages.

Tara Ali-Yahiya, "Chapter 2—Network Architecture and Protocols," Understanding LTE and its Performance, 2011, pp. 17-39.

Bart Barton, "X2-Based Handover with SGW Relocation," http://www.lteandbeyond.com/2012/03/x2-based-handover-with-sgw-relocation.html, Mar. 16, 2012, 4 pages.

* cited by examiner

100

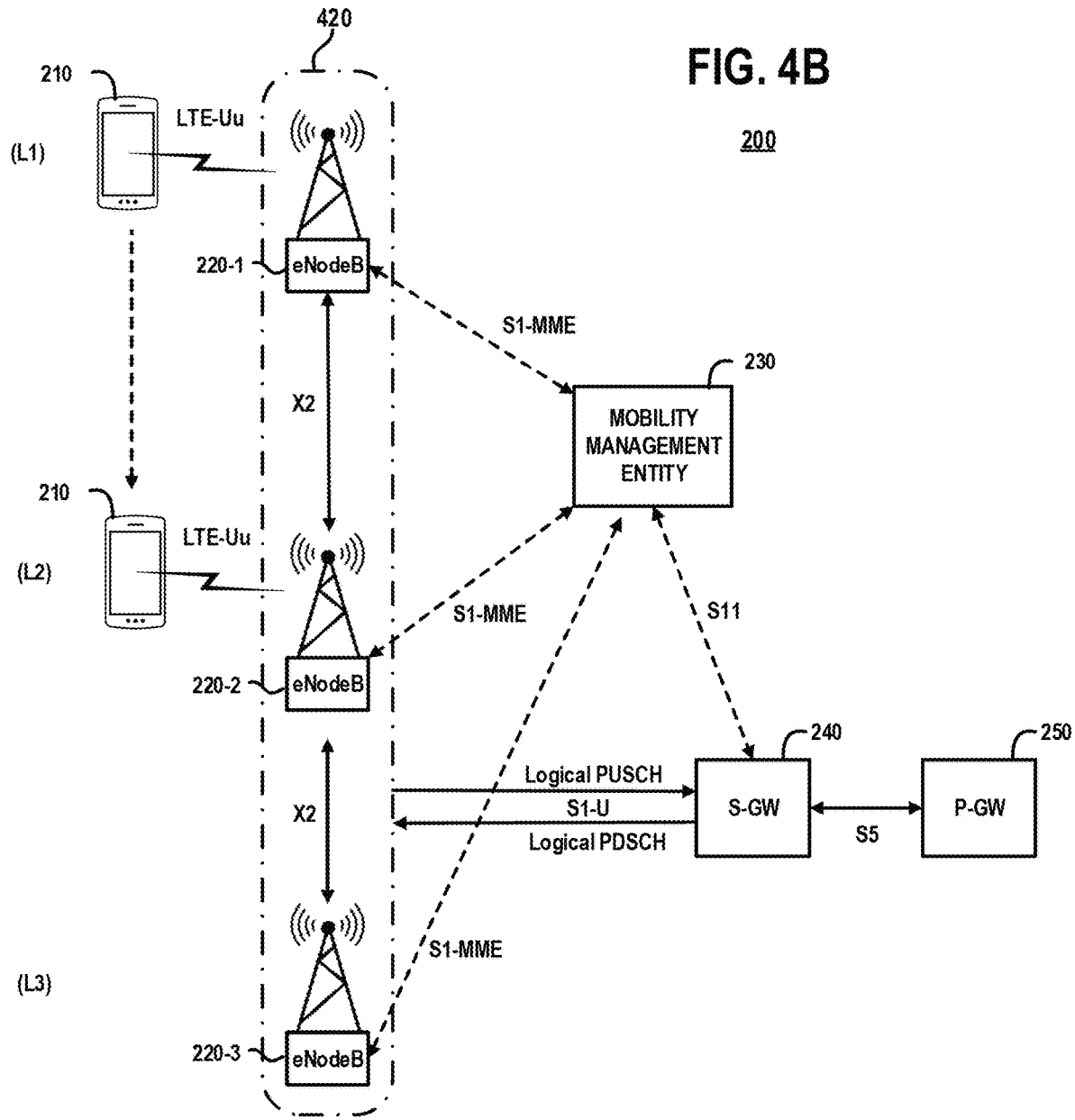

SHARING OF CONTEXT AMONG BASE STATION NODES FOR MOBILITY MANAGEMENT IN MOBILE COMMUNICATIONS NETWORK

FIELD

This disclosure generally relates generally to mobile communications networks and, in particular, to systems and methods for mobility management in mobile communications networks.

BACKGROUND

In contrast to conventional circuit-switched cellular systems, the Fourth-Generation (4G) Long-Term Evolution (LTE) wireless technology standard implements a packet-switched framework to provide seamless Internet Protocol (IP) connectivity between end user equipment (UE) and a packet data network (PDN) with the goal of avoiding disruption of end-user applications as a result of UE mobility. The 4G LTE standard provides the foundation for the new 5G wireless standard. In contrast to 4G which utilizes large, high-power cell towers to radiate signals over longer distances, it is expected that 5G wireless systems will be implemented using a large amount of small cell stations that are located in places such as light poles, etc. In its current architecture evolution, 5G mobile networks will not be able to cope with the requirements of high mobility UE in cases such as Connected Vehicle Technology (CVT), high-speed railway, commercial drone applications, etc.

Indeed, the use of high mobility UE (e.g., cars, bus, trains, drones, etc.) within an LTE wireless network requires an increase in the bandwidth of Radio Access Network (RAN) traffic to properly handle the increased number of access procedures, Access Stratum (AS) procedures, Non-Access Stratum (NAS) attach/detach procedures, and tracking area updates (TAUs), LTE handover events, etc., which are needed for effective mobility management. Current handover schemes for 4G LTE, and those proposed for 5G, are not well-suited for high-mobility applications as such handover schemes can require more time to complete than that time it takes for a fast-moving UE to travel from one base station node to the next base station node. In this regard, the latency of handover operations can render a fast-moving UE connectionless for a period of time. Therefore, decreased latency in various control procedures (e.g., handovers) and minimal involvement of mobility management procedures in the core networks of 4G and 5G mobile communication systems will be needed for seamless and continuous connectivity in high-mobility, time-sensitive applications.

SUMMARY

Illustrative embodiments of the invention include methods for sharing context among base station nodes for mobility management in mobile communications networks. For example, in one embodiment, a method comprises: establishing an active connection between a first base station node and a mobile device of an end user, wherein the first base station node is part of a radio access network of a mobile communications network; determining other base station nodes in the radio access network within a tracking area of the mobile device; performing a state propagation process to share a state of the active connection between the first base station node and the mobile device with at least a second base station node determined to be within the tracking area of the mobile device; utilizing the shared state to enable the mobile device to seamlessly establish an active connection with the second base station node and communicate with the mobile communications network through the active connection with the second base station node; and releasing the active connection between the first base station node and the mobile device.

Other embodiments of the invention include, without limitation, computing systems and articles of manufacture comprising processor-readable storage media.

BRIEF DESCRIPTION OF THE DRAWINGS

FIG. 4B schematically illustrates a method for sharing context among base station nodes for mobility management within a mobile communications network, according to an embodiment of the invention.

DETAILED DESCRIPTION

Illustrative embodiments of the invention will now be explained in further detail with regard to systems and methods for sharing context among base station nodes for mobility management in mobile communications networks. As explained in further detail below, base station nodes are configured to perform state propagation methods to share the state of an active connection between a UE and a serving eNodeB with other base station nodes that are determined to be within a current tracking area of the UE. The sharing of the active connection state of the UE among a plurality of base station nodes within the current tracking area of the UE allows the UE to seamlessly establish active connections with new base station nodes (which comprise the shared state) and communicate with a mobile communications network through the active connection with new base station nodes, as the UE moves through the network. In addition, control methods are implemented to enable propagation of the UE active connection state among a set of collaborating base station nodes with a "finite time stability" to minimize or otherwise eliminate latency in the communication between base station nodes to collaboratively share the UE state. The UE state sharing and propagation methods as discussed herein advantageously eliminate the need for the complex, conventional handover schemes, and provide solutions for reducing the number of procedures needed (e.g., access procedures, attach/detach procedures, tracking area updates, etc.) to effectuate seamless and continuous connectivity between a UE and a mobile communications network in high-mobility, latency sensitive applications.

Figure 1:
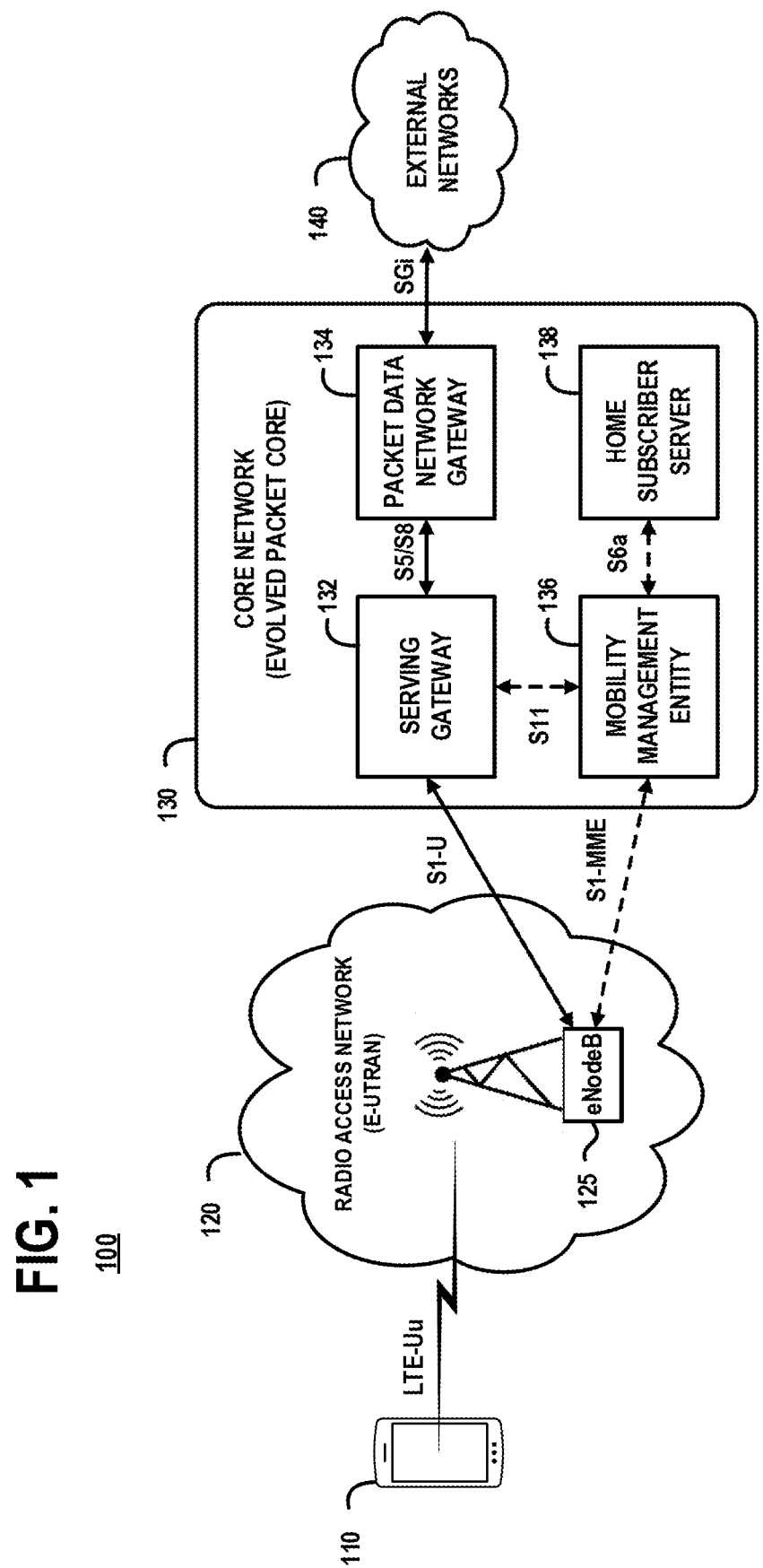
FIG. 1 is a high level schematic illustration of a mobile communications network which can be configured to implement methods according to embodiments of the invention for sharing context among base station nodes for mobility management within the mobile communications network.

FIG. 1 is a high level schematic illustration of a mobile communications network 100 which can be configured to implement methods according to embodiments of the invention for sharing context among base station nodes for mobility management within the mobile communications network 100. The mobile communications network 100 comprises a mobile device 110, a radio access network 120, a core network 130, and external networks 140 (e.g., packet data network (PDN)). In one embodiment, the radio access network 120 and the core network 130 form an Evolved Packet System (EPS) network, wherein the radio access network 120 comprises an Evolved Universal Mobile Telecommunications System (UMTS) Terrestrial Radio Access Network (or "E-UTRAN"), and wherein the core network 130 comprises an Evolved Packet Core (EPC) network. The E-UTRAN is a radio access network which implements LTE radio interface technology. The EPS network provides end-users with IP connectivity to a PDN e.g., connecting to the Internet, a private corporate network, IP multimedia subsystem, a Voice over IP (VoIP) service, etc. The EPS network comprises a network architecture which separates the user data (referred to as "user plane") from the control signaling (referred to as "control plane") to make the scaling independent.

The mobile device 110 can be a smart phone, laptop computer, electronic tablet, a vehicle (e.g., car, bus train, drone, etc.) with wireless connectivity, or any type of wireless device (terminal device) that can be utilized by an end-user to communicate with a network. In the context of LTE, the mobile device 110 is alternatively referred to herein as UE.

The radio access network 120 manages radio communications and connectivity between the UE 110 and the core network 130. The radio access network 120 comprises a network of base station nodes 125 (although only one base station node 125 is shown in FIG. 1 for ease of illustration). In the context of an LTE access network (i.e., E-UTRAN), the base station node 125 is referred to as an evolved NodeB (or eNodeB). Each eNodeB 125 is a base station node that controls the UEs in one or more cells. The base station node that is actively communicating with a given UE is referred to as its serving eNodeB. In the example embodiment, the radio access network 120 comprises a packet-switched radio interface, and provides support for interaction with other systems (e.g., GSM/EDGE, UMTS, CDMA2000, WiMAX, etc.).

The core network 130 is responsible for overall control of the UE 110 and establishing bearers. In the context of an LTE EPC network, the core network 130 comprises a plurality of logical nodes including a serving gateway 132 (referred to herein as "S-GW"), a packet data network gateway 134 (referred to herein as P-GW), a mobility management entity 136 (referred to herein as "MME"), and a home subscriber server 138 (referred to herein as "HSS"). The S-GW 132 and P-GW 134 implement user-plane functionality to transport IP data traffic between the UE 110 and the external networks 140. The MME 136 controls the high-level operation of the UE 110 by means of control signaling messages and information provided by the HSS 138. The HSS 138 comprises a central database which maintains information regarding the end-users (and associated UEs) who subscribe to the service provider of the network.

More specifically, the S-GW 132 essentially serves as a router which implements user-plane functionality to forward IP data traffic between a base station node in the RAN 120 and the P-GW 134. In other words, all user IP packets are transferred through the S-GW 132. The S-GW 132 serves as a local mobility anchor for data bearers when a UE moves between eNodeBs. The S-GW 132 provides an anchor point for intra-LTE mobility (i.e. in case of handover between eNodeBs) and between LTE and other 3GPP accesses. The S-GW 132 is logically connected to the P-GW 134. The S-GW 132 also serves as a mobility anchor for interworking with other 3GPP technologies such as general packet radio service (GPRS) and UMTS.

The P-GW 134 provides a point of interconnect between the core network 130 and the external IP networks 140. The P-GW 134 implements user-plane functionality to route IP data packets to/from the external networks 140. The P-GW 134 also performs various functions such as IP address/IP prefix allocation for the UE, as well as QoS enforcement and flow-based charging according to specified rules. The P-GW 134 filters downlink IP packets into different QoS-based bearers. The P-GW 134 serves as a mobility anchor for interworking with non-3GPP technologies such as CDMA2000 and WiMAX® networks, or other types of WLANs or fixed networks.

The MME 136 implements control-plane functionality to handle the signaling related to mobility and security for E-UTRAN access. In particular, the MME 136 comprises a control node which processes control signaling between the UE 110 and the core network 130. The protocols that are implemented between the UE 110 and the core network 130 are referred to as the Non-Access Stratum (NAS) protocols. The MME 136 provides the termination point for the NAS. The MME 136 supports functions related to bearer management (e.g., establishment, maintenance and release of bearers) which are handled by a session management layer in the NAS protocol. The MME 136 supports functions related to connection management such as establishment of the connection and security between the core network 130 and the UE 110, which are handled by the connection or mobility management layer in the NAS protocol layer. The MME 136 is configured to track and page a UE in idle-mode.

The HSS 138 comprises a database that contains user-related and subscriber-related information (e.g., EPS-subscribed QoS profile, access restrictions for roaming, etc.). The HSS 138 provides support functions in mobility management, call and session setup, user authentication and access authorization (e.g., based on the Home Location Register (HLR) and Authentication Centre (AuC)). The HSS 138 maintains dynamic information such as the identity of the MME 136 to which a user is currently attached or registered. The HSS 138 may also integrate the authentication center (AUC), which generates the vectors for authentication and security keys.

The network elements/nodes in the mobile communications network 100 of FIG. 1 are connected using standardized interfaces. For example, the UE 110 connects to the base station node 125 (e.g., eNodeB) using a specific LTE radio interface (Uu). The base station nodes 125 (eNodeBs) of the RAN 120 connect to the core network 130 using an S1 interface. The S1 interface comprises a S1-U (user plane) interface to connect the base station node 125 to the S-GW 132, and a S1-MME (control plane) interface to connect the base station node 125 to the MME 136. The base station nodes (eNodeBs) within the RAN 120 are connected to each other via an X2 interface which is primarily utilized for control signaling and packet forwarding during a handover. The S-GW 132 and the MME 136 communicate using an S1 interface. The S-GW 132 and P-GW 134 are connected using a S5/S8 interface (S5 interface if the two nodes are in the same network, and S8 if the two nodes are in different networks). The P-GW 134 communicates with the external networks 140 using a SGi interface.

An IP data packet for a UE is encapsulated in an EPC-specific protocol and tunneled between the P-GW 134 and the eNodeB 125 for transmission to the UE 110. Different tunneling protocols are used across different interfaces. The GPRS Tunneling Protocol (GTP) is used over the core network interfaces, S1 and S5/S8. In particular, GTP-U is utilized for transmitting user data within the core network 130 and between the RAN 120 and the core network 130. The user data transported can be in IPv4 or IPv6 packets, or other packet formats. GTP-U is an IP-based tunneling protocol which allows multiple tunnels to be established between each set of end points. The separate tunnels are identified by a TEID (Tunnel Endpoint Identifier) in GTP-U.

The S1-U interface provides non-guaranteed data delivery of LTE user plane Protocol Data Units (PDUs) between the eNodeB 125 and the S-GW 132. The transport network layer is built on IP transport and GTP-U, and User Datagram Protocol/Internet Protocol (UDP/IP) carries the user plane PDUs between the eNodeB 125 and the S-GW 132. A GTP tunnel per radio bearer carries user traffic. The S1-MME interface is responsible for delivering signaling protocols between the eNodeB 125 and the MME 136. S1-MME interface utilizes a Stream Control Transmission Protocol (SCTP) over IP and supports multiple UEs through a single SCTP association. It also provides guaranteed data delivery. The application signaling protocol is an S1-AP (Application Protocol). The LTE S1-MME is responsible for EPS bearer setup/release procedures, handover signaling procedures, paging procedures and NAS transport procedures.

To provide ubiquitous coverage, it is essential to ensure that end-users are able to access services as they move across the coverage area of the mobile communications network. In this regard, the LTE protocol layers of the EPS are configured to support UE mobility by determining the appropriate serving cells that are capable of providing optimal radio link conditions for a moving UE to prevent any disturbance in ongoing application sessions to maintain a desired quality of service (QoS). While a given UE is in a connected state with a serving eNodeB, the UE may need to handover to another target eNodeB due to a degradation in the received signal power strength with the serving eNodeB as the UE moves away from the coverage area of the serving eNodeB. In this instance, conventional schemes implement a handover (HO) process to change the association of a UE (in the connected state) from a current serving eNodeB to a new eNodeB by performing the requisite signaling exchange process to perform the HO, while ensuring minimal delay and avoiding unnecessary cell changes. There are different types of HO protocols in an LTE network. For example, LTE eNodeBs are configured to execute handovers within the E-UTRAN (inter/intra-eNodeB) and between legacy Radio Access Technologies (RATs) such as UMTS. In particular, one type of HO protocol in an LTE network comprises an intra-LTE HO protocol wherein the source and target cells are part of the same LTE network (in which case a HO occurs between eNodeBs in the same cell). Another type of HO protocol in an LTE network comprises an inter-LTE HO protocol, wherein the source and target cells are not part of the same LTE network. There are two general types of handovers in LTE-X2 based, and S1 based.

Figure 2A:
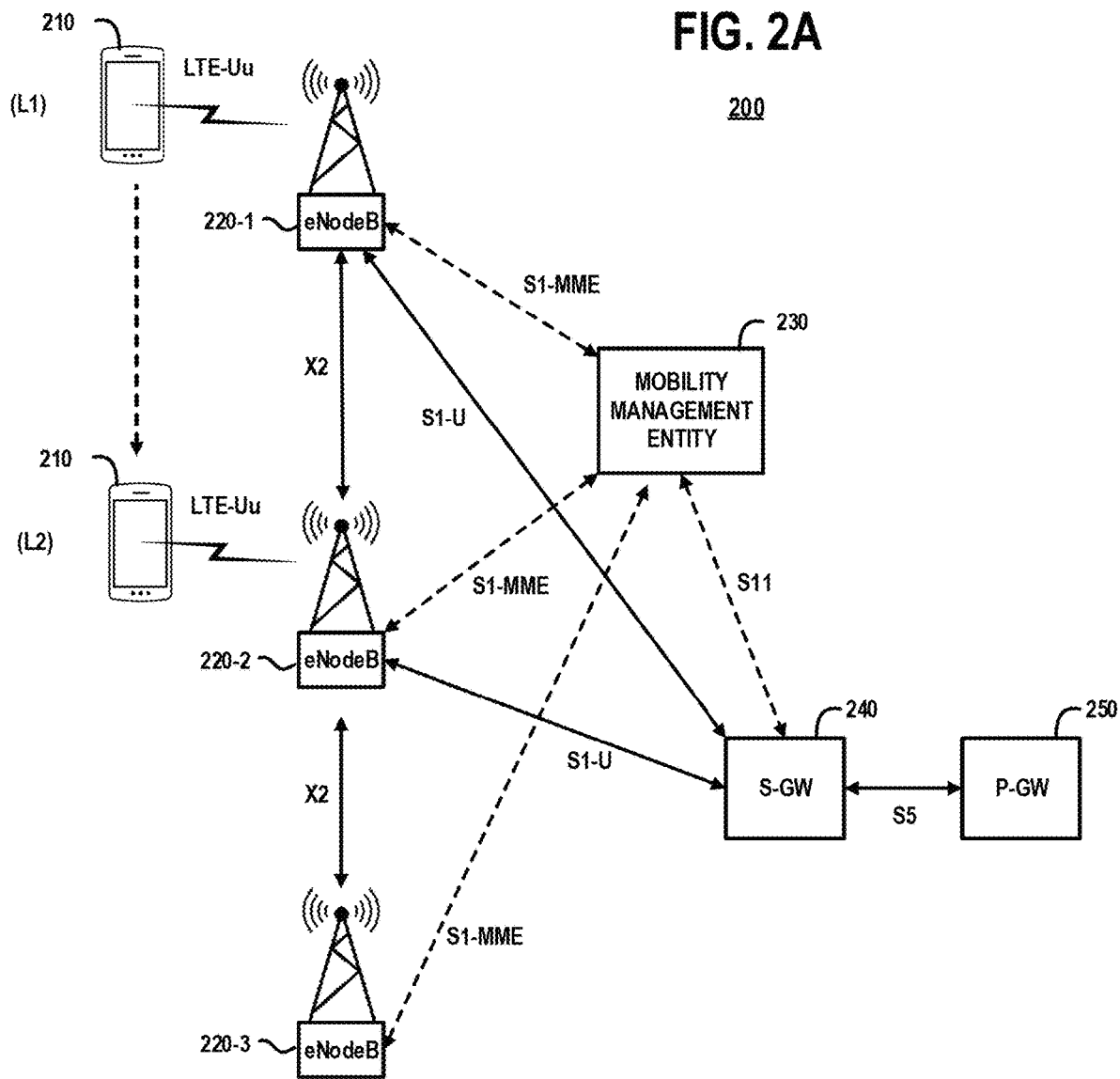
FIG. 2A schematically illustrates a conventional handover process which occurs in a mobile communications network to handover a mobile device from a source base station node to a target base station node using an X2 interface when a mobility management entity and serving gateway in a core network remain unchanged.

For example, FIG. 2A schematically illustrates a conventional handover process which occurs in a mobile communications network to handover a mobile device from a source base station node to a target base station node using an X2 interface when a mobility management entity and serving gateway in a core network remain unchanged. In particular, FIG. 2A schematically illustrates an intra-LTE handover process which occurs in an LTE mobile communication network to handover a UE from a source eNodeB to a target eNodeB using an X2 interface when an MME and S-GW are unchanged. FIG. 2A illustrates an LTE mobile communications network 200 comprising mobile device 210 (or UE), plurality of base station nodes 220-1, 220-2, 220-3 (or eNodeBs), an MME 230, an S-GW 240, and a P-GW 250. FIG. 2A schematically illustrates a handover process which occurs when the UE 210 moves from a first location (L1) to a second location (L2). At the first location L1, the UE 210 is in an active connected state (i.e., in LTE, in an EMM-Registered/ECM-Connected/RRC-Connected state) with the base station node 220-1 (or source eNodeB), wherein the location L1 of the UE 210 is known by the core LTE network at the cell level. In this state, the UE 210 is associated with the MME 230, which maintains the UE context. This context comprises UE-specific information such as the UE identity, mobility state, security parameters, and tracking area. In the connected state, the UE context is maintained in the base station node 220-1, wherein the UE context is utilized to create signaling and data radio bearers for communication and to manage the UE 210 while it remains in the active connected state.

In the active connected state (prior to the handover process), an EPS bearer is established between the UE 210 and P-GW 250 endpoints, wherein the EPS bearer essentially provides a virtual connection between the UE 210 and the P-GW 250. Indeed, since EPS is a connection-oriented transmission network, a virtual connection needs to be established between two endpoints (e.g. a UE and a P-GW). The EPS bearer uniquely identifies traffic (data) flows that receive a common QoS treatment (i.e., specific QoS attributes) between the UE 210 and the P-GW 250 for the GTP-based S5/S8 interface. The EPS bearer comprises an e-Radio Access Bearer (e-RAB) and an S5/S8 bearer. The e-RAB transports the packets of an EPS bearer between the UE 210 and the S-GW 240. The S5/S8 bearer transports the packets of an EPS bearer between the S-GW 240 and the P-GW 250. The e-RAB comprises a data radio bearer (DRB) and an S1 bearer. The DRB transports the packets of an EPS bearer between the UE 210 and the eNodeB 220-1. The S1 bearer transports the packets of an E-RAB between the eNodeB 220-1 and the S-GW 250.

In the active connected state of the UE 210 at location L1, a DRB exists between the UE 210 and the base station node 220-1, and a GTP tunnel is established via the S1 bearer between the base station node 220-1 and the S-GW 240, enabling data to be transmitted in the uplink and downlink direction between the UE 210 and the core network (or EPC). As the UE 210 moves to the second location L2 serviced by the base station node 220-2, an intra-LTE handover process is performed (using the X2 interface) to connect the UE 210 to the target base station node 220-2. The X2 handover procedure is performed without involvement of the core network (EPC), i.e., preparation messages are directly exchanged between the source base station node 220-1 and the target base station node 220-2. The release of the resources at the source base station node 220-1 during the handover completion phase is triggered by the target base station node 220-2. The intra-LTE handover process of FIG. 2A comprises different phases including: (i) a handover preparation phase; (ii) a handover execution phase; and (iii) a handover completion phase.

The handover preparation phase generally involves the source base station node 220-1 transmitting a "measurement control request" message (from the network) to the UE 210 (via a signaling radio bearer), which triggers the UE 210 to send a "measurement report" with information regarding, e.g., the radio signal strength of the serving cell and the target cell. The UE 210 sends the measurement report when, for instance, the radio signal strength of a neighboring cell become stronger than the serving cell. The source base station node 220-1 makes a handover decision to handover the UE 210 to the target base station node 220-2 based on a given handover determination process.

During the handover preparation phase, the X2 Application protocol (X2AP) is used to establish an X2 control plane signaling link over the X2 interface between the source and target base station nodes 220-1 and 220-2. In addition, an X2 transport bearer (direct GTP tunnel) is established between the source and target base station nodes 220-1 and 220-2, which is used during a handover execution phase to transmit downlink data traffic from the source base station node 220-1 to the target base station node 220-2.

During the handover preparation phase, the source base station node 220-1 can issue a "resource status request" message to determine the load on target base station node 220-2, and the source base station node 220-1 can make the decision to continue with the handover procedure based on a received "resource status response." In addition, during the handover preparation phase, the source base station node 220-1 issues a "handover request" message (via X2 interface) to the target base station node 220-2 if the target base station node 220-2 is served by the same MME 230 The handover request message includes various types of information to prepare the handover at the target base station node 220-2 (e.g., UE context information which includes the security context and RB (resource block) Context (including E-RAB to RB Mapping), and the target cell information (e.g., ECGI). The target base station node 220-2 performs an admission control process on receipt of the handover request, and responds with a "handover request acknowledge" message (via X2 interface), which comprises a transparent container to be sent to the UE 210 as an RRC message to perform the handover operation. The container includes a new C-RNTI, target eNodeB security algorithm identifiers for the selected security algorithms, and may include a dedicated RACH (Random Access Channel) preamble and possibly some other parameters (i.e., access parameters, system information blocks (SIBs), etc.). The handover request acknowledge message includes information regarding the accepted RABs (e.g., uplink and downlink GTP tunnel information for each RAB). At this point, the X2 transport bearer is established for the downlink (DL) data traffic from the source base station node 220-1 to the target base station node 220-2.

At this point, a handover execution phase is commenced by the source base station node 220-1 generating a "handover command" (e.g., an RRC message) to the UE 210 to perform the handover, i.e., an "RRC connection reconfiguration" message including information such as the C-RNTI of the target base station node 220-2, the target DRB ID for the uplink and downlink of data traffic between the UE 210 and the target base station node 220-2, and other information. The source base station node 220-1 sends a "status transfer" message to the target base station node 220-2 to convey the PDCP (packet data convergence protocol) and HFN (Hyper Frame Number) status of the E-RABs. The source base station node 220-1 starts forwarding the downlink data packets to the target base station node 220-2 for all the data bearers (which are being established in the target node during the handover request message processing). In the meantime, the UE 210 tries to access the target base station node 220-2 using a non-contention-based Random Access Procedure. If it succeeds in accessing the target base station node 220-2, the UE 210 sends a "handover confirmation" message to the target base station node 220-2 (e.g., an "RRC connection reconfiguration complete" message).

At this point, the new DRB is established between the UE 210 and the target base station node 220-2, and the UE 210 detaches from the source base station node 220-1. Direct packet forwarding of the DL traffic from the source node to the target node is performed over the X2 transport bearer between the source and target base station nodes 220-1 and 220-2.

The handover completion phase is commenced by the source base station node 220-1 generating a Handover Command (e.g., an RRC message) to complete the handover. The target base station node 220-2 sends a "path switch request" message to the MME 230 to inform the MME 230 that the UE 210 has changed base station nodes. This messages requests switching of the S1-U GTP tunnel towards the target base station node 220-2. The MME 230 determines that the S-GW 240 can continue to serve the UE 210. The MME 230 sends a "modify bearer request" message to the S-GW 240, wherein the MME 230 request the S-GW 240 to switch the path to the target base station node 220-2. The S1-U GTP tunnel endpoint identifiers (TEIDs) for the downlink user plane for the accepted EPS bearers are passed to the S-GW 240. The S-GW 240 sends a "modify bearer response" message to the MME 230 after the S-GW 240 updates the bearer. The S-GW 240 sends the downlink packets to the target base station node 220-2 using the newly received addresses and TEIDs (e.g., path switched in the downlink data path to the target base station node 220-2) along with the "modify bearer response" message to the MME 230. The S-GW 240 then sends one or more "end marker" packets on the old path (S1-U) to the source base station node 220-1 to release the S1 bearer of the source base station node 220-1. The MME 230 responds to the target base station node 220-2 with a "path switch acknowledge" message to notify the completion of the handover. The target base station node 220-2 then requests the source base station node 220-1 to release the resources using an X2 "UE context release" message, and the X2 transport bearer for the direct packet forwarding is released. At this point, the handover procedure is complete. A TAU process is then performed if the handover results in a change in the tracking area of the UE 210.

Figure 2B:
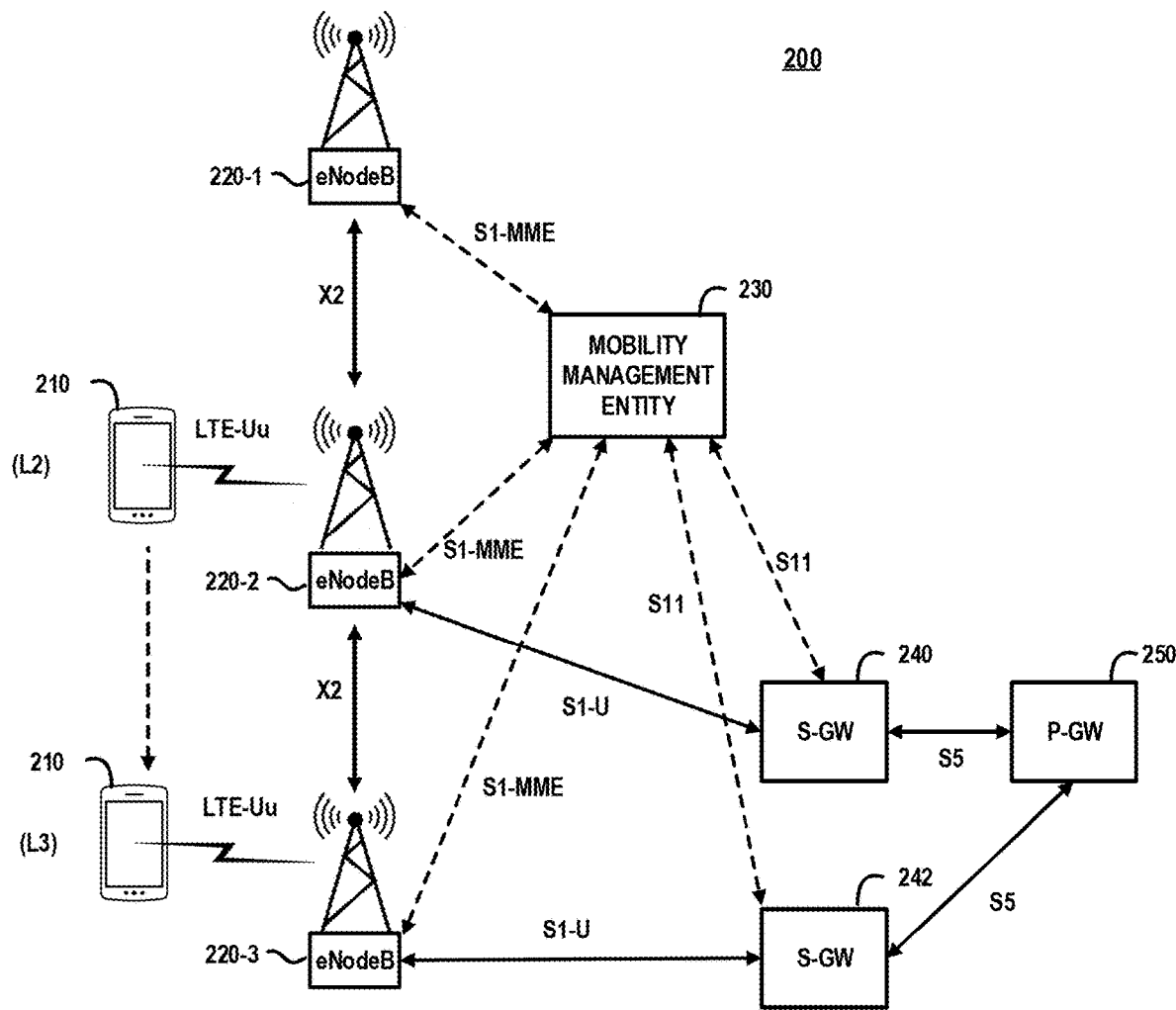
FIG. 2B schematically illustrates a conventional handover process which occurs in a mobile communications network to handover a mobile device from a source base station node to a target base station node using an X2 interface when a mobility management entity is unchanged and a serving gateway is relocated.

FIG. 2B schematically illustrates a conventional handover process which occurs in a mobile communications network to handover a mobile device from a source base station node to a target base station node using an X2 interface when a mobility management entity is unchanged and a serving gateway is relocated. In particular, FIG. 2B schematically illustrates a handover process which occurs in the mobile communications network 200 when the UE 210 moves from the second location (L2) to a third location (L3) which is serviced by the target base station node 220-3, and when a new S-GW 242 is configured to serve the UE 210 connected to the target base station node 220-3. The handover process in FIG. 2B is similar to the handover process discussed above, except that the handover completion phase includes an additional process to establish an S1-U bearer between the target base station node 220-3 and the new S-GW 242, and release the S1-U bearer between the source base station node 220-2 (to which the UE 210 was previously connected) and the old S-GW 240 which previously served the UE 210.

For intra-LTE mobility within the LTE system, the X2-handover procedure is utilized for inter-eNodeB handover. However, an S1-handover operation is performed when (i) there is no X2 interface between the two eNodeBs, or (ii) if the source eNodeB has been configured to initiate handover towards a particular target eNodeB through the S1 interface. The S1-handover procedure comprises a preparation phase, followed by an execution phase, and a completion phase, the details of which are known in art.

The conventional handover schemes discussed above require a relatively significant amount of time to execute, and may not be well-suited for high-mobility, latency sensitive, applications (e.g., Connected Vehicle Technology (CVT) or high-speed railway applications) where the time to complete the handover is greater than the time it takes for a fast-moving UE to travel from one base station node to the next base station node. In this regard, the latency of handover operations can render a fast-moving UE connectionless for a period of time. The handover is a key procedure to ensure that UE devices move through the mobile communications network freely and seamlessly. As noted above, the UE could be anything that has mobility capabilities starting from cellular phone to a car, bullet train or a drone. Conventional handover control parameters, such as handover hysteresis and time-to-trigger (TTT), can be optimized to enhance the handover success rate. Although TTT can mitigate the ping-pong handover (PPHO) effect, it also causes radio link failure (RLF) due to delayed handover. Accordingly, decreased latency in various control procedures (e.g., handovers) and minimal involvement of mobility management procedures in the core networks of 4G and 5G mobile communication systems is needed for seamless and continuous connectivity in high-mobility, time-sensitive applications. Embodiments of the invention are configured to replace conventional handover schemes, or otherwise eliminate various processes of conventional LTE handover schemes, through the propagation and sharing of UE state among a collaborating set of base stations nodes. In addition, embodiments of the invention utilize control schemes to enable the propagation and sharing of UE state among the base station nodes with a finite time stability to eliminate or minimize a "penalty" in the time it takes to propagate the state throughout the network nodes.

Figure 3:
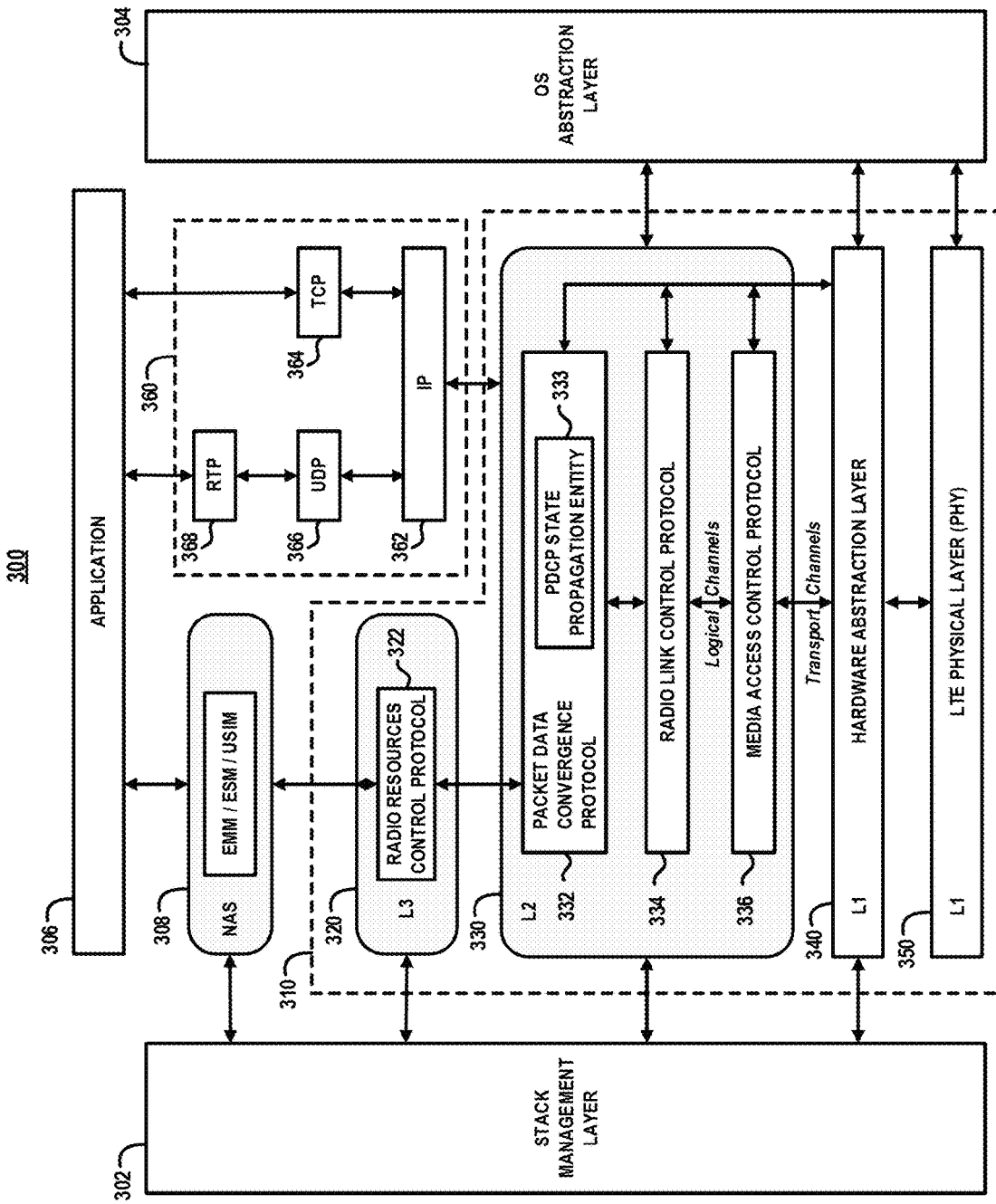
FIG. 3 schematically illustrates a protocol stack and base station node architecture which is configured to share context among base station nodes for mobility management within a mobile communications network, according to an embodiment of the invention.

FIG. 3 schematically illustrates a protocol stack and base station node architecture which is configured to share context among base station nodes for mobility management within a mobile communications network, according to an embodiment of the invention. In particular, FIG. 3 schematically illustrates a framework 300 to implement a user plane and control plane architecture of a base station node (eNodeB) and mobile device (UE) in an EPS network, according to an embodiment of the invention. The framework 300 comprises a stack management layer 302, an operating system (OS) abstraction layer 304, an application 306, a non-access stratum (NAS) layer 308, a radio protocol stack 310 (or E-UTRAN protocol stack), and an Internet Protocol (IP) stack 360. The radio protocol stack 310 comprises a level 3 (L3) protocol layer 320, a level 2 (L2) protocol layer 330, and level 1 (L1) protocol layers 340 and 350. The L3 protocol layer 320 comprises a radio resources control (RRC) layer 322. The L2 protocol layer 330 comprises a packet data convergence protocol (PDCP) layer 332, a radio link control (RLC) layer 334, and a media access control (MAC) layer 336. The PDCP layer 332 comprises a PDCP state propagation entity 333. The L1 layers comprise a hardware abstraction layer 340 and a LTE physical layer (PHY) 350. The IP stack 360 comprises an IP layer 362, a transmission control protocol (TCP) layer 364, a user datagram protocol (UDP) layer 366, and a real-time transport protocol (RTP) layer 368.

The stack management layer 302 comprises an application programming interface (API) which is configured to provide access and management of the various services of the NAS layer 308, and the radio protocol stack layers L3, L2, and L1. The OS abstraction layer 304 provides an API to an abstract operating system. The OS abstraction layer 304 provides an abstraction of common system functionalities of an operating system, using known techniques (e.g., wrapper functions that encapsulate the system functions offered by the OS). In addition to the OS APIs, the OS abstraction layer 304 can provide the hardware abstraction layer 340 which is designed to provide a portable interface to hardware devices such as memory, I/O ports, and non-volatile memory. In particular, the hardware abstraction layer 340 comprises a programming layer that allows the stack management layer 302 and the OS abstraction layer 304 to interact with the hardware devices of the physical layer 350 at an abstract level rather than at a detailed hardware level.

The framework 300 of FIG. 3 illustrates elements that are present on a UE and on an eNodeB. However, the application 306 and the NAS 308 are elements that are present on the UE and not on the eNodeB. In addition, while the PDCP layer 332 is present on the UE and eNodeB, the PDCP state propagation entity 333 is present in the PDCP layer 332 of the eNodeB and not the PDCP layer 332 of the UE. In one embodiment, the various layers and components shown in FIG. 3 comprise software modules that are persistently stored in a storage device. The software modules are loaded into system memory resources and executed by processing units (e.g., central processing units) to perform various functions as described herein. In this regard, system memory resources and other memory or storage media, which have program code and data tangibly embodied thereon, are examples of what is more generally referred to as "processor-readable storage media" which store executable program code of one or more software programs. Articles of manufacture comprising such processor-readable storage media are considered embodiments of the invention. An article of manufacture may comprise, for example, a storage device such as a storage disk, a storage array or an integrated circuit containing memory. The term "article of manufacture" as used herein should be understood to exclude transitory, propagating signals.

The framework 300 of FIG. 3 is separated into a control plane architecture and a user plane architecture. For the user plane architecture, the application 306 (which executes on the UE) creates data packets that are processed by the IP protocols 360. The user plane protocol stack between the base station node (eNodeB) and the UE comprises the PDCP layer 332, the RLC layer 334, and the MAC layer 336, which layers are present on both the base station node and the UE. For the control plane architecture, the RRC layer 322 generates signaling messages that are exchanged between the base station node and a mobile device (or UE). In the control plane, the RRC layer 320 implements methods handling initial connection setup, radio resource configuration/reconfiguration, and mobility management of connected UEs. In addition, the RRC layer 320 serves as a transport protocol for NAS signaling messages between a UE and an MME. Again, while FIG. 3 illustrates a NAS layer 308 for purposes of discussion, in the LTE EPS system architecture, the NAS layer 308 is present on UEs and MMES, and not on eNodeBs. In both the user and control plane modes, the information is processed by the PDCP layer 332, the RLC layer 334, and the medium MAC layer 336, before being passed to the physical layer 350 for transmission.

The physical layer 350 is configured to carry all information from the transport channels of the MAC protocol layer 336 over physical channels (e.g., air interface) of the physical layer 350. The physical layer 350 implements Orthogonal Division Multiple Access (OFDM) in downlink connections, and Single-Carrier Frequency Division Multiple Access (SC-FDMA) in uplink directions. The MAC protocols layer 336 provides a set of logical channels to the RLC protocol layer 334 which it multiplexes into transport channels of the physical layer 350. In other words, the MAC protocol layer 336 provides a mapping between logical channels and transport channels. The MAC protocol layer 336 manages other functions such as HARQ error correction, priority handing between UEs by means of dynamic scheduling, priority handing between logical channels of one UE, and logical channel prioritization.

The RLC protocol layer 334 transports protocol data units (PDUs) of the PDCP layer 332. The RLC protocol layer 334 is responsible for providing reliable packet transport services, segmentation/concatenation and in-sequence delivery of upper layer data units. It can work in three different modes depending on the reliability provided. Depending on this mode it can provide (i) automatic repeat query (ARQ) error correction, segmentation/concatenation of PDUs, reordering for in-sequence delivery, duplicate detection, etc.

The PDCP layer 332 handles the tasks of IP header compression/decompression, ciphering/deciphering of user data, and integrity protection of both user-plane and control-plane data. In particular, the PDCP layer 332 provides transport of data of the RRC layer 320 with ciphering and integrity protection. The PDCP layer 332 provides transport of IP packets for the IP layer 362 with Robust Header Compression (ROHC) for headers of IP, UDP, RTP, and TCP packets, ciphering, and depending on the RLC mode, in-sequence delivery, duplicate detection and retransmission of its own service data units (SDUs) during handover.

The RRC protocol layer 320 implements methods to broadcast system information related to the non-access stratum and the access stratum (AS), paging, establishment, maintenance and release of an RRC connection between a UE and a base station node, security functions including key management, establishment, configuration, maintenance and release of point to point Radio Bearers.

The NAS layer 308 and IP protocol stack 360 comprise interfacing layers outside of the radio protocol stack 310. In particular, the IP protocol stack 360 provides an interface between the application 306 and the radio protocol stack 310 (E-UTRAN protocol stack). The IP layer 362, the TCP layer 364, the UDP layer 366, and the RTP layer 368 implement well known functions, the detail of which are readily understood by one of ordinary skill in the art. Briefly, the IP layer 362 performs the principle functions for delivering/routing data packets between source and destination hosts based on IP addresses in packet headers. The TCP layer 364 provides a communication service at an intermediate level between the application 306 and the IP layer 362. The TCP layer 364 provides host-to-host connectivity at the transport layer of the IP stack 360, by providing reliable, ordered and error-checked deliver of data between applications running on hosts communicating via an IP network. The UDP layer 366 provides connectionless datagram services with reduced latency as it does not require a reliable data stream service. The RTP layer 368 executes on top of the UDP layer 366 and implements a network protocol for delivering streaming media (audio and video) for various applications (e.g., telephony, video teleconference, etc.) over IP networks.

The NAS layer 308 is a functional layer in the LTE protocol stack between the core network and the UE. The NAS layer 308 is configured to manage the establishment of communication sessions and for maintaining continuous communications with UEs as the UEs move. The NAS layer 308 provides a protocol between the UE and the MME on the network side (outside of E-UTRAN). The NAS layer 308 is utilized to convey non-radio signaling between a UE and a MME for an LTE/E-UTRAN access. From a protocol stack perspective, the NAS layer 308 is the highest stratum of the control plane between a UE and a MME. The NAS protocol layer 308 includes protocols to support the mobility of a UE and session management procedures to establish and maintain IP connectivity between a UE and a P-GW.

The NAS layer 308 implements various modules including an EPS Mobility Management (EMM) module, an EPS Session Management (ESM) module, and protocols, a Universal Subscriber Identity Module (USIM) application. The NAS layer 308 provides protocols for messages passed between the UE and MME transparently through the radio network. Examples of NAS messages include Update or Attach messages, Authentication Messages, Service Requests, etc. Once a UE establishes a radio connection, the UE uses the radio connection to communicate with the core nodes to coordinate service. The NAS layer 308 enables dialogue between the UE and core network nodes.

The EEM module implements protocols related to mobility over an E-UTRAN access, authentication and security, wherein the protocols include common, specific and connection management procedures: The EMM common procedures refer to various network-initiated mechanisms including, for example, GUTI (Global Unique Temporary ID) reallocation, authentication, security mode control, identification, and EMM information. The EMM specific procedures are UE-initiated. The EMM specific procedures define mechanisms to attach/detach to/from the core network, and include a TAU mechanism, which updates the location of the UE within the network. In EPS, a UE initiates a TAU when it detects that it enters into a new tracking area (TA). EMM connection management procedures provide several functions to support the connection of the UE to the network (e.g., service request which is initiated by the UE to start the establishment of NAS signaling connection, paging which is initiated by the network in case of downlink NAS signaling to indicate to the UE to start a service request, etc.).

The ESM module comprises protocols to support the establishment and handling of user data in the NAS layer 308. In EPS, IP connectivity between a UE and a PDN include (i) PDN connection, and (ii) EPS bearer. A PDN connection comprises a default EPS bearer and optionally "dedicated bearers". A default bearer is created upon establishment of a PDN connection. If a service (e.g. video streaming) requires specific handling in terms of quality of service (QoS), dedicated bearers can be established. Within a PDN connection, all EPS bearers share a same UE IP address and access point name (APN). EPS supports multiple simultaneous PDN connections. For instance, a UE can have a PDN connection to the Internet (with just a default EPS bearer) and one to the operator's IMS (with additional dedicated bearers, if required by the service).

ESM procedures are grouped into two categories: (i) EPS bearer procedures, which are network-initiated and provide mechanisms for activation, deactivation or modification of EPS bearers, and (ii) transaction-related procedures, which are UE-initiated and provide mechanisms for, e.g., requests for PDN connection establishment and disconnection, requests for bearer resources allocation and modification, and release requests.

The USIM module is the functional equivalent of the SIM in a GSM device. It is the entity that stores subscriber-related information and implements the security functions pertaining to authentication and ciphering on the user side in LTE devices.

The PDCP layer 332 is one of the user plane protocols (e.g., L2 user plane protocols 330) in LTE. The PDCP layer 332 is present in UEs and in base station nodes (eNodeBs). In a base station node, the PDCP layer 332 interfaces with the RRC protocol layer 322, the RLC protocol layer 334, and a GTP module (which can be a component of the PDCP layer 332). The PDCP layer 332 sends and receives packets to and from a UE and an eNodeB over an air interface. The PDCP protocol operates in conjunction with the RLC protocol layer 334 and the MAC protocol layer 336 of the L2 user plane protocol layers 330. On the user plane, packets in the core network (EPC) are encapsulated using GTP and tunneled between a P-GW and an eNodeB (over S1 and S5/S8 interfaces). Packets received by a layer are called service data units (SDUs) while packets output from a layer are referred to as packet data units (PDUs) (or protocol data units unitci).

The PDCP layer 332 provides an interface to the RRC protocol layer 332 to create PDCP contexts for radio bearers (e.g., SRB and DRB) which are used to send packets to a UE. The parameters of a PDCP context include a Virtual Instance ID (or operator ID), a Sector ID, C-RNTI (Cell-Radio Network Temporary Identifier), and a LCI (logical channel identifier). The Virtual Instance ID is a parameter that is derived from, or otherwise corresponds to, the PLMN ID of the operator. The Sector ID is a parameter that is used to determine a distinct cell ID of a base station node. The C-RNTI parameter provides a unique ID for identifying an RRC connection and scheduling which is dedicated to a particular UE (i.e., C-RNTI essentially provides a UE ID for transmitting traffic from an eNodeB to a specific UE after RACH). The LCI is a parameter that identifies a logical channel instance of a corresponding MAC SDU or the type of the corresponding MAC control element (i.e., the LCI indicates whether MAC data corresponds to a control signal, or user data or a signaling message etc.).

The PDCP layer 332 transfers uplink packets to a GTP module of the PDCP layer 332, which in turn tunnels the uplink packets to the core network. The PDCP layer 332 receives downlink packets from the GTP module (which are received from the core network) and sends the packets to the RLC protocol layer 334 which in turn sends the downlink packets to the UE. In this regard, the PDCP layer 332 sits between RLC protocol layer 334 and the GTP module. Essentially, the PDCP layer 322 is the layer where an RF signal becomes IP-based.

The GTP module implements an IP/UDP based protocol to encapsulate user data for transmission through the core network, and to carry bearer-specific signaling traffic between various core network entities. While the GTP control plane (GTP-C) manages and controls signaling (i.e. the establishment and tear-down of GTP tunnels for PDCP contexts), the GTP user plane (GTP-U) carries user IP data inside GTP tunnels (i.e., GTP-U creates GTP tunnel contexts). In the eNodeB, the GTP-U encapsulates user plane IP data packets which are generated by the UE and transmitted to the eNodeB, and the GTP-U forwards the GTP encapsulated data to an S-GW.

In particular, the application 306 (on the UE) generates data and the IP protocol stack 360 (on the UE) encapsulates the data in IP data packets. The IP data packets include the application data, a TCP or UDP header, and IP field information which comprises a source address of the UE and a destination address of a target application server. When the eNodeB receives the IP data packets over the air interface, the PDCP layer 332 in the eNodeB processes the IP data packets and then passes the IP data packets to the GTP module, along with RB identification information to identify the GTP-U tunnel in the uplink direction (e.g., Virtual Instance ID, Sector ID, C-RNTI, LCI).

The GTP-U adds a GTP header to an IP packet (wherein the GTP header comprise information regarding the GTP tunnel IDs), and the resulting packet is further encapsulated within an outer UDP and IP header, and then forwarded to an S-GW in a GTP tunnel in an uplink direction. In this instance, the outer IP header contains the eNodeB IP as the source address and the S-GW IP as the destination address.

The PDCP layer 332 provides an interface to the RLC protocol layer 334 to send PDCP PDUs including PDCP control and data PDUs to the RLC protocol layer 334. The RLC protocol layer 334 utilizes the same bearer identification parameters to match its context as the PDCP layer 332 does including, for example, Virtual instance ID, Sector ID, C-RNTI, LCI, and other information. The PDCP layer 332 receives downlink packets from the GTP module (which are received from the core network) and sends the packets to the RLC protocol layer 334 which in turn sends the downlink packets to a UE. In the downlink direction, the GTP-U on the eNodeB de-tunnels (decodes) the IP data packets received from the core network over a GTP tunnel and passes the packets to the PDCP layer 332 to send the data packets to the UE. As part of de-tunneling, it removes the GTP-U, UDP and outer IP headers.

In the downlink direction, the packets received by the GTP module include a GTP-U header and an outer IP header. The GTP-U header contains the TEID (Tunnel End Point ID). The GTP-U tunnel context can be identified using the source and destination IP addresses of outer IP header and the TEID. In this regard, the following parameters can be used to identify the GTP-U tunnel in the downlink direction: Virtual instance ID, source IP (from outer IP header of GTP), destination IP (from outer IP header of GTP), and the TEID (which is the ID that was sent to the S-GW by the control plane for the S-GW to send the packet to the proper GTP-U tunnel).

As part of S1-AP and X2-AP protocols, GTP tunnel contexts are created in the GTP-U module. A GTP tunnel context is referred to herein as PDCP state. The PDCP layer 332 can contain multiple contexts, wherein there is one PDCP context for a given radio bearer. From the perspective of an eNodeB, the PDCP state (e.g., tunnel contexts generated by the GTP-U) would include tunnel contexts for uplink and downlink, with various parameters of such contexts maintained in hash tables. For example, in some embodiments, in an uplink hash table, the PDCP state for a given uplink GTP context would include parameters such as the Virtual Instance ID, Sector ID, C-RNTI, and LCI. In a downlink hash table, the PDCP state for a given downlink GTP context would include parameters such as IP type (IPv4, IPv6), source IP and destination IP addresses from a GTP-U packet, and a TEID from the GTP-U packet. Since both sides of the PDCP layer 332 (i.e., the RLC layer 334 and the GTP module) utilize the same identifiers to identify the PDCP state, a single search table is sufficient across multiple administrative domains.

As noted above, the PDCP layer 332 of a base station node comprises the PDCP state propagation entity 333. The PDCP state propagation entity 333 implements methods to perform a state propagation process to share the state of the active connection between a UE and a serving eNodeB with other base station nodes (eNodeBs) that are determined to be within a current tracking area of the UE. In one embodiment, the shared state of the UE comprises the PDCP context in the PDCP layer 332 for a radio bearer associated with the UE connection. The sharing of the PDCP state for the given UE among a plurality of base station nodes within the current tracking area of the UE allows the UE to seamlessly establish an active connection with a new base station node (which comprise the shared state) and communicate with the mobile communications network through the active connection with new base station node, as the UE moves through the network.

The application of the UE state propagation process to share the UE state among eNodeBs (which are virtualized and software based) within the tracking area of the UE eliminates the need to perform conventional handover scheme as discussed above. At the very least, the sharing of the UE state among the base station nodes eliminates the need for the "handover completion" phases of conventional handover schemes, and eliminates the need for various elements of the "handover execution" phases of conventional handover schemes. For example, the collaborative sharing of the UE state via the state propagation process reduces the amount of access procedures, NAS attach/detach procedures, and tracking area updates, which are needed for mobility management. Since the base station nodes within the current tracking area of the UE already have knowledge of the UE state, the connection with new base station nodes can be performed expeditiously and seamlessly.

In another embodiment, to eliminate or minimize the communication latency (or penalty) associated with propagating UE state among the network nodes, the PDCP state propagation entity 333 implements a control process to propagate the UE state throughout the network nodes with a minimal "finite time stability." The control process takes into account the inherent communication delay between elements of a networked software systems. The sharing of UE state among a collaborating set of base station nodes, in conjunction with the use of a control process to propagate the UE state to achieve the state collaboration among the set of eNodeBs in finite time stability, effectively enables seamless mobility of UE in latency sensitive applications.

In one embodiment, the PDCP state propagation entity 333 implements a synchronizing second order sliding mode control process to determine a finite time stability based on a Lyapunov functional, to determine a minimal time for communication between base stations nodes to coordinate the collaborative sharing of UE state. In one embodiment, the second order sliding mode control process is implemented using techniques similar to those disclosed in the article by M. Fathallah, et al., entitled "*A Synchronizing Second Order Sliding Mode Control Applied To Decentralized Time Delayed Multi-Agent Robotic Systems: Stability Proof*", which is published in Advances in Science, Technology and Engineering Systems Journal, Vol. 2, No. 3, pp. 160-170, 2017 (the "Article"), which is fully incorporated herein by reference.

The Article proposes a sliding mode control process to synchronize multiple robot manipulators in the presence of time delay in the communication between robots. The Article proposes a finite time stability based on a Lyapunov functional for synchronization of a networked robotic system where time delay exists during the communication between robots. A second order sliding mode control (SMC) is utilized to minimize communication delay and ensure position synchronization of networked robot manipulators. The Article discloses a sliding mode control process comprising (i) a reaching phase (where system trajectories are forced to reach a specific surface in a given state space and then remain on the surface) and (ii) a sliding phase which is performed to determine the finite time stability with the system trajectories confined to the sliding surface. The sliding mode control is developed using the Lyapunov Theory in order to ensure the convergence to the sliding surface and achieving a finite time stability.

The principles disclosed in the Article can be applied in the context of exemplary embodiments of the invention to provide methods for optimizing the communication for state sharing among base station nodes. In this instance, the second order sliding mode control process can be applied in the context of a decentralized time-sensitive NAS framework to determine a finite time stability (based on a Lyapunov functional) for communication among networked software systems where time delay exists during the communication between components. In the context of embodiments discussed herein, two robotic arms communicating (as described in the Article) is equivalent to two eNodeBs communicating to share UE state. The finite time stability during the communication between components is advantageous, since state collaboration in a decentralized system comes with a "penalty", i.e., the latency in propagating the UE state throughout the network. Based on the fact that the UE context is shared by a collaborating set of eNodeBs within a current tracking area of the UE, the UE context-switching between base station nodes as supported through the collaborative state sharing process will out-perform or otherwise eliminate current handover schemes.

It is to be appreciated that a multi-faceted solution comprising (i) UE state propagation throughout the network for sharing the UE context among a set of collaborating eNodeBs (which are virtualized and software based) and (ii) propagating the UE state throughout the network without communication latency penalty, or at the worst case provide a finite time stability for the UE state propagation, effectively eliminates the need for the complex, time-consuming handover schemes using LTE systems. Instead, a UE switch from one base station node to another base station node comprises a simple inline state change on the UE based on, for example, the following high-level algorithm: (i) determine a strongest radio signal from an eNodeB in a current tracking area of the UE; and (ii) select eNodeB with the strongest radio signal and switch the active communication session to the selected eNodeB using the shared UE context which the selected eNodeB already has via a previous state propagation process. Since this behavior is already embedded in the protocols of UE, no change is needed in the UE framework to effect seamless mobility of UE via the shared state.

Figure 4A:
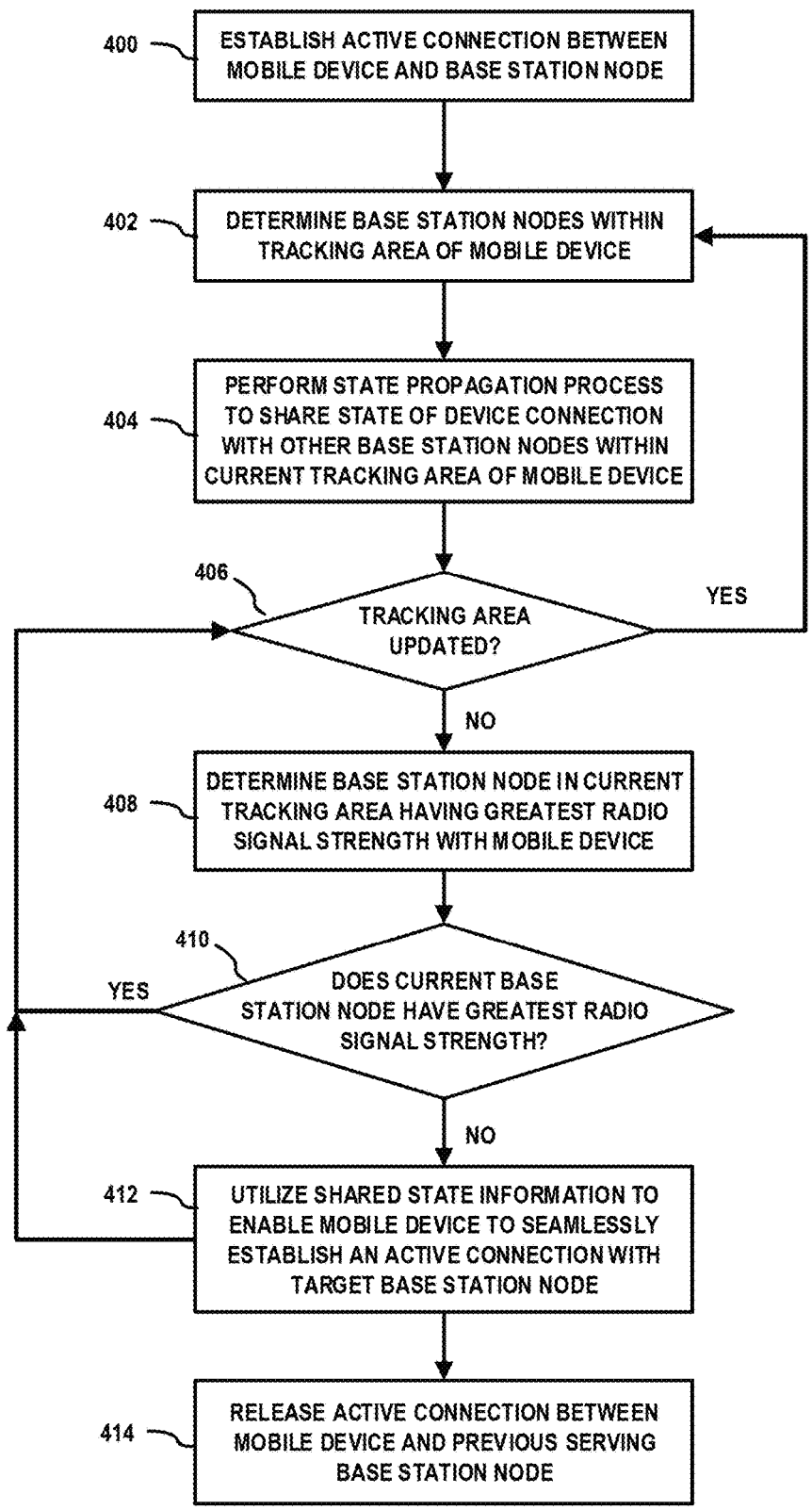
FIG. 4A is a flow diagram of a method for sharing context among base station nodes for mobility management within a mobile communications network, according to an embodiment of the invention.

FIG. 4A is a flow diagram of a method for sharing context among base station nodes for mobility management within a mobile communications network, according to an embodiment of the invention. The method commences with a mobile device establishing an active connection with a base station (block 400). This process can be implemented using standard LTE access procedures for when the mobile device is initially powered-up, or when the mobile device switched from an idle (standby) state to an active state. For example, for an initial UE access, the access procedures include, for example, cell search and selection, receiving system information, and performing a random access procedure. In the connected state, the UE is associated with an MME, which maintains the UE context. This context includes UE-specific information such as its identity, mobility state, security parameters, and tracking area (TA). When a UE switches from an idle to a connected state, the MME communicates the UE context to the chosen base station node, which is used to create signaling and data radio bearers for communication and manage the UE while it stays in a connected state.

Upon the occurrence of a certain event, the mobile device will perform a tracking area update (TAU) to update the tracking area (TA) location of the mobile device within the network. For example, a UE can initiate a TAU process when the UE detects that it has entered a new TA, or periodically perform a TAU process upon the expiration of a pre-specified time, etc. The UE will notify the LTE network MME of its current location by sending a TAU Request message when it moves between TAs. As is known in the art, a TA comprises a group of neighboring base station nodes (eNodeBs), wherein the node groupings are pre-specified by the system operator. A TA is defined as an area in which a UE can move freely without updating the MME. A UE will obtain a TAI (Tracking Area Identifier) List when it attaches to the LTE network. The TAI List specifies one or more TAs within which the UE can travel without performing a TAU process. Each base station node (eNodeB) broadcasts a special tracking area code (TAC) to indicate to which TA the eNodeB belongs to, wherein the TAC is unique within a given Public Land Mobile Network (PLMN). Since a PLMN is a unique number allocated to each of the system operator and TAC is a unique in a PLMN, a tracking area identify (TAI) can be generated by combining PLMN and TAC to obtain a globally unique number for the TAI.

With the current TA information of the mobile device, the serving base station node (serving eNodeB) can determine other base station nodes within the current TA of the mobile device (block 402). The PDCP state propagation entity of the PDCP layer of the serving base station node will commence a state propagation process to share the state of the active connection between a UE and the serving eNodeB with other base station nodes (eNodeBs) that are determined to be within a current TA(s) of the UE (block 404). In one embodiment, as noted above, the shared state comprises a PDCP context of the radio bearer for the active connection between mobile device and the network. For example, in one embodiment, the PDCP context comprises a Virtual Instance ID, a Sector ID, a C-RNTI, and a LCI, although other parameters can be included as part of the shared PDCP context.

If the tracking area of the mobile device is updated at a given time that the mobile device is in an active connected state (affirmative determination in block 406), the currently serving base station node will perform a state propagation process to share the current PDCP context of the mobile device with other non-serving base station nodes which are determined to be within the updated tracking area and which do not have the current PDCP context (blocks 402 and 404).

While the mobile device is moving through the RAN, the mobile device will determine a base station node within the current TA which has a greatest radio signal strength with the mobile device (block 408). For example, while an RRC connection is established, the serving base station node will send an RRC Connection Reconfiguration message to the mobile device providing notification of the types of measurements to take and the types of events the serving base station node would like reported (referred to as the measurement criteria). The mobile device monitors neighboring cells as it moves through the RAN. When any of the specified reporting criteria is met, the UE sends the results to the network in a Measurement Report message. As noted above, the Measurement Report message may include, for example, the radio signal strength of the serving eNodeB, and the radio signal strength of a potential target eNodeB and a corresponding PCI (physical cell ID) which comprise a pseudo-unique value for identifying the target eNodeB.

If the currently serving base station node has the highest radio signal strength as compared to other neighboring base station nodes within the given tracking area (affirmative determination in block 410), the currently serving base station node will remain connected to the mobile device, and the process flow of blocks 406, 402 and 404, for example, are repeated by the currently serving base station node, as needed. On the other hand, if it is determined that the currently serving base station node does not have the greatest radio signal strength as compared to a neighboring base station node (negative determination in block 410), the shared state information of the mobile device is utilized to enable the mobile device to seamlessly establish an active connection with the target base station node and communicate with the mobile communications network through the active connection with the target base station node (block 412). Once the signal strength of the previously serving base station node falls below a given level, the mobile device can release the active connection to that base station node, and seamlessly continue communication with the network through the active connection of the new serving base station node (block 414).

The process implemented in block 412 of FIG. 4A for utilizing the shared state information of the mobile device to enable the mobile device to seamlessly establish an active connection with a new base station node and communicate with the mobile communications network through the active connection with the new base station node, will be explained in further detail with reference to FIG. 4B. FIG. 4B schematically illustrates a method for sharing context among base station nodes for mobility management within a mobile communications network, according to an embodiment of the invention. In particular, FIG. 4B illustrates the LTE mobile communications network 200 of FIG. 2A in an exemplary state in which the plurality of base station nodes 220-1, 220-2, and 220-3 comprise a set of collaborating eNodeBs having a logically shared PDCP layer 420 to enable the base station nodes 220-1, 220-2, and 220-3 within the TA of the UE 210 to logically share the PDCP states of the UE as the UE moves from location L1 to location L2 (and also to location L3 from L2). As further shown in FIG. 4B, the logically shared PDCP layer 420 allows the collaborating set of base station nodes 220-1, 220-2, and 220-3 to logically share a PUSCH (physical uplink shared channel) and a PDSCH (physical downlink shared channel) over an S1-U to the S-GW 240, thus, in effect, creating one logical eNodeB. This is in contrast to conventional handover schemes where the PDSCH and PUSCH would be re-assigned in each handover process for the UE connecting to a new base station node.

As noted above, a C-RNTI is a unique identification used for identifying an RRC connection with a given UE. A base station node (eNodeB) assigns different C-RNTI values to different UEs. The base station node utilizes the C-RNTI to allocate a UE with uplink grants, downlink assignments, PDCCH (physical downlink control channel) orders etc. The base station node also uses the C-RNTI to differentiate uplink transmissions (e.g. PUSCH, PUCCH (physical uplink control channel) of different UEs. In a conventional handover scheme, a temporary C-RNTI is generated as part of a Random Access procedure, and then promoted to a C-RNTI after connection establishment or re-establishment. In current handover schemes within E-UTRA or from another RAT to E-UTRA, C-RNTI is explicitly provided by the eNodeB in a MobilityControlInfo container with a new UE-identity.

In contrast to conventional handover schemes, embodiments of the invention eliminate the need to perform the process for assigning a temporary C-RNTI since the PDCP state of the UE, including the C-RNTI, is shared among the collaborating base station nodes. When a switch to a new target base station node is executed, the assignment of temporary C-RNTI is not necessary since the UE has already previously generated a C-RNTI in a first Random Access Response (RAR) when actively connecting with a previous source base station node. The UE receives the C-RNTI from the new base station node, as the C-RNTI of that specific UE is shared with the new base station prior to the arrival of the UE at the new base station. The UE simply resumes using its C-RNTI and the communication continues seamlessly. In conventional schemes, the temporary C-RNTI is used while the eNodeB fetches all the required information from the MME that is required to establish the links. However, since the PDCP state is shared among all collaborating eNodeBs in the TA of the UE, all the information needed for link establishment is already present in the new target base station node, allowing the new base station node to seamlessly establish the requisite links and seamlessly continue communication between the UE and core network.

In one embodiment, the sharing of the PDCP state allows fast and efficient switching between base station nodes. For example, the serving base station node will communicate with the target base station node over an X2 interface to determine if the target base station node can accept an active connection with the mobile device and, if so, command the target base station node to allow the mobile device to establish an active connection with the target base station using the current PDCP context information, which has already been shared with the target base station node. Indeed, since PDCP state is shared, the requisite resources are virtually pre-allocated at the target base station node and are activated in response to the switching request issued by the source (currently serving) base station node. Moreover, since the collaborating base station nodes essentially form a virtual eNodeB, wherein the C-RNTI is virtualized and pre-allocated, and since the requisite parameters/unique identifiers are shared and known to all collaborating base station nodes in the TA, the new connection between the UE and new base station node simply needs to be activated, and not allocated, which significantly reduces the time for switching to the new base station node. In one embodiment, both base station nodes maintain a cooperative relationship and communicate with the mobile device simultaneously as the mobile device remains within an overlapping area between the base station nodes. In this regard, the mobile device can receive signals from the two cooperative eNodeBs, which allows both base station nodes to transmit the user plane/control data to the mobile device with the same frequency resource without interrupting communications, which avoids the interrupt latency caused by current hard handover in LTE systems.

Figure 5:
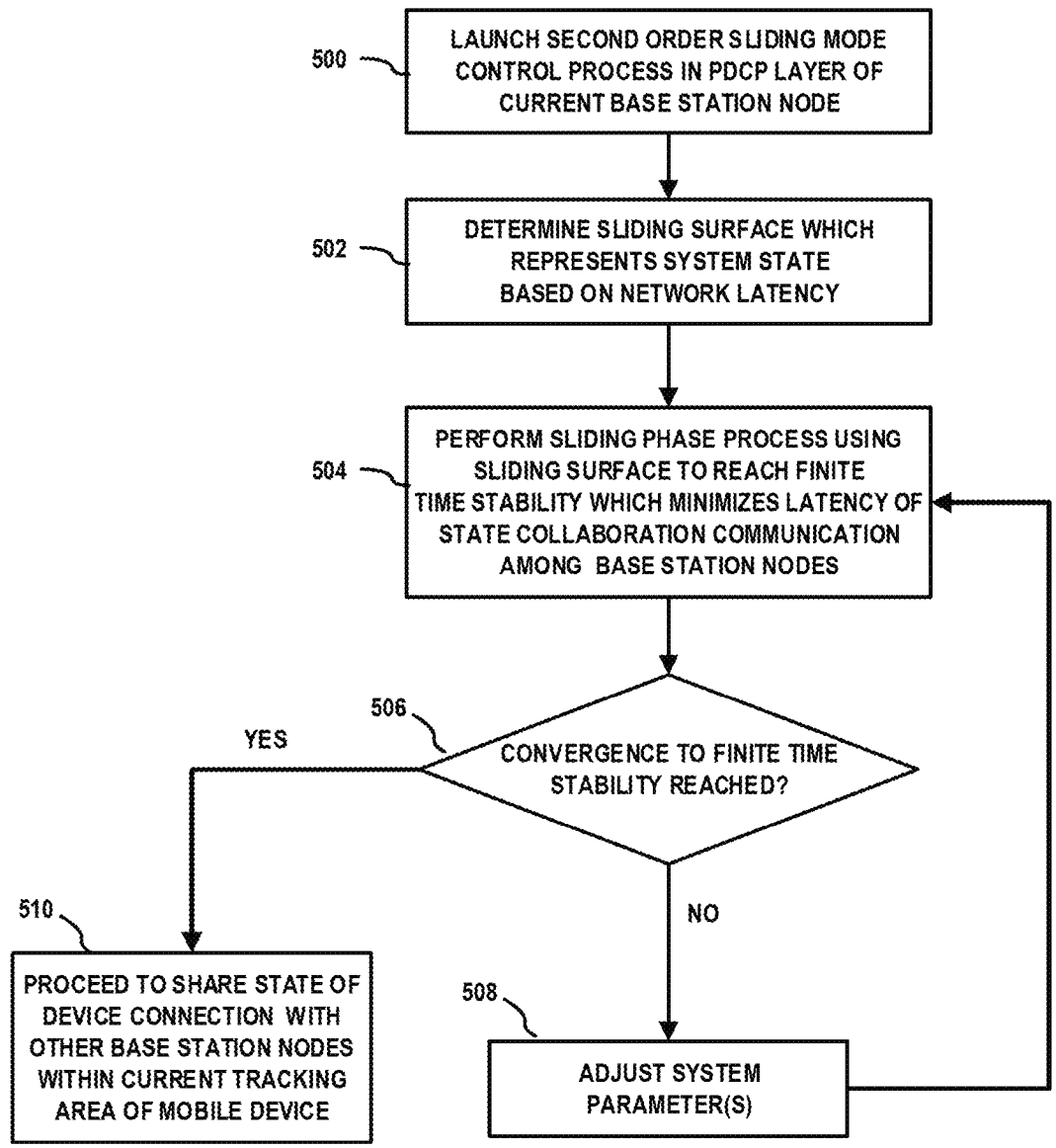
FIG. 5 is a flow diagram of a method for sharing context among base station nodes for mobility management within a mobile communications network, according to another embodiment of the invention.

FIG. 5 is a flow diagram of a method for sharing context among base station nodes for mobility management within a mobile communications network, according to another embodiment of the invention. In particular, FIG. 5 is an example sliding mode control process which can be incorporated as part of the state propagation process (e.g., block 404, FIG. 4A) to configure the mobile communications network to propagate the UE state throughout the network nodes with a minimal "finite time stability." Before sharing PDCP context of the UE, the PDCP state propagation entity of the PDCP layer of the serving base station node will commence a second order sliding mode control process (block 500) to configure the mobile communications network in a way that allows the UE state to be propagated throughout the network nodes with a minimal finite time stability. An initial phase of the process comprises determining sliding surface which represents a constraint to the system state based on network latency (block 502). A sliding phase process is them performed using the sliding surface to reach a finite time stability which minimizes the latency of the network system with regards to state collaboration communication among the base station nodes which are to share the current PDCP state of the mobile device (block 504).

If convergence to the finite stability has not been reached based on a current set of system parameters (negative result in block 506), the control process proceeds to adjust one or more system parameters (block 508), and the sliding phase process is repeated (block 504). This iterative process is repeated until convergence to a finite time stability has been reached (affirmative result in block 506). As this point, the PDCP state propagation entity of the PDCP layer of the serving base station node will proceed to share the PDCP state with other base station nodes within the current TA of the mobile device (block 510). Depending on the dynamics of the networking system, the process of FIG. 5 may or may not be repeated each time a serving base station node propagates the current PDCP context of the UE to collaborating base station nodes.

The exemplary techniques as disclosed herein for sharing context among base station nodes for mobility management within a mobile communications network are well suited for high-mobility, latency sensitive applications, where fast moving wireless UE elements require continuous connectivity to a mobile network without interruption. For example, the mobility management techniques discussed herein are well suited for application within the domain of Cooperative Intelligent Transport Systems (C-ITS), which will allow vehicles (cars, buses, etc.) and traffic managers to share information and use the shared information to coordinate their actions. The cooperative element which is enabled by wireless connectivity between vehicles and between vehicles and transport infrastructure, is expected to significantly improve road safety, traffic efficiency and comfort of driving, by helping drivers make certain decision and adapt to traffic conditions. Seamless and continuous communication between vehicles, infrastructure and other transportation-related entities is crucial for the safety of future automated vehicles and their full integration in the overall transport system.

Furthermore, due to the higher data rate and lower system latency, LTE has been chosen as the next generation's evolution of railway mobile communication system by the International Union of Railways. However, as noted above, there are various latency issues that need to be solved for the application of high mobility applications in LTE systems, namely, the increased probability of handover failure for conventional handover protocols, which can seriously degrade the reliability of vehicular communications systems for latency sensitive applications where public safety is involved. Indeed, as noted above, an increase in handover failure probability is realized when the time for a moving vehicle with a wireless UE element to travel from one eNodeB to another eNodeB is less than the time it takes to complete the handover operation. This can render the moving UE element connectionless for a given period of time. However, embodiments of the invention allow for continuous and seamless connectivity in high-mobility, latency sensitive application, through the propagation of a shared UE state among a set of collaborating base station nodes with a tracking area of the UE.

Figure 6A:
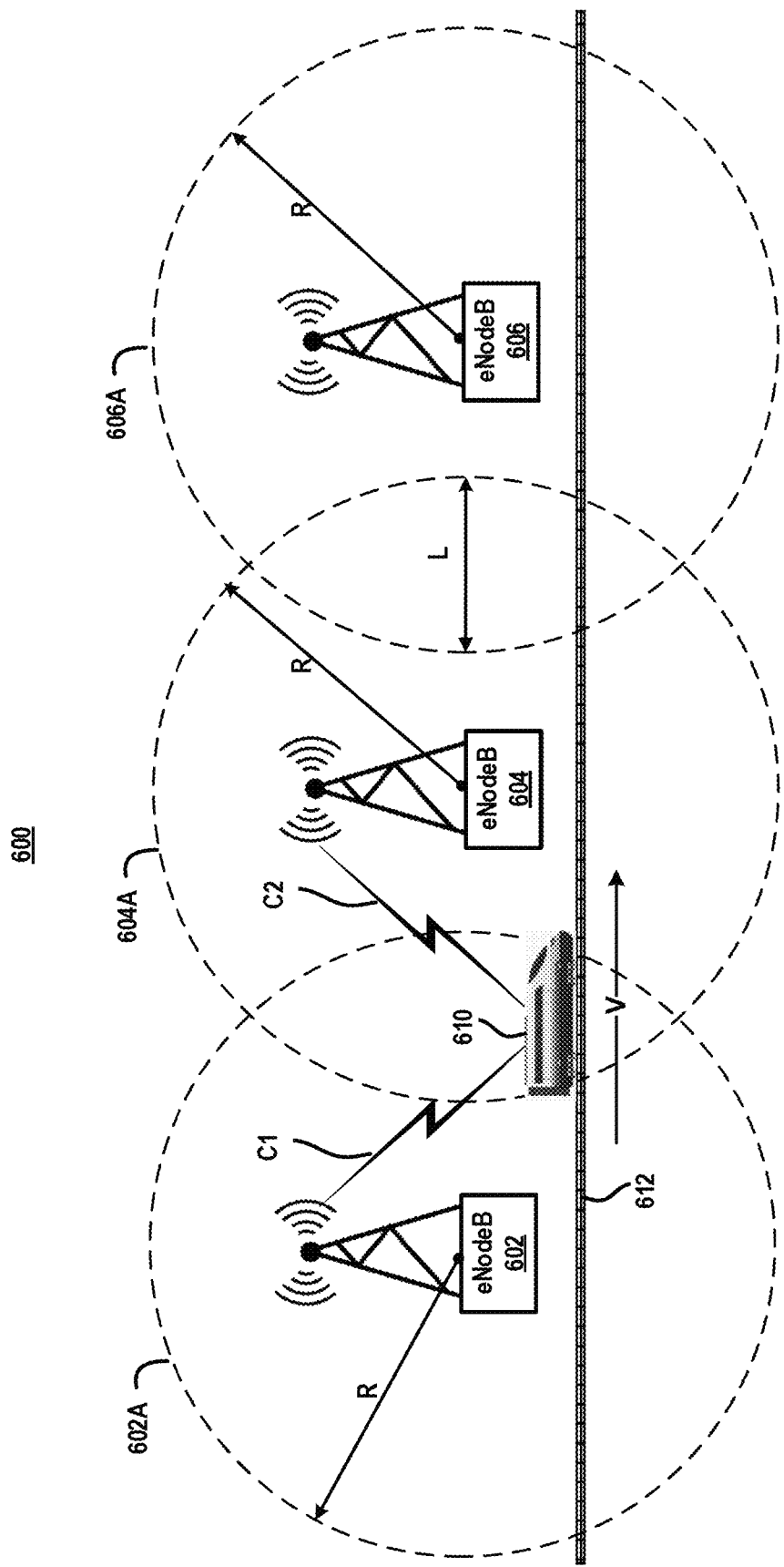
FIGS. 6A and 6B schematically illustrate a method for sharing context among base station nodes for mobility management in a mobile communications network in the context of a fast-moving vehicle with wireless connectivity to the mobile communications network, according to an embodiment of the invention.
Figure 6B:
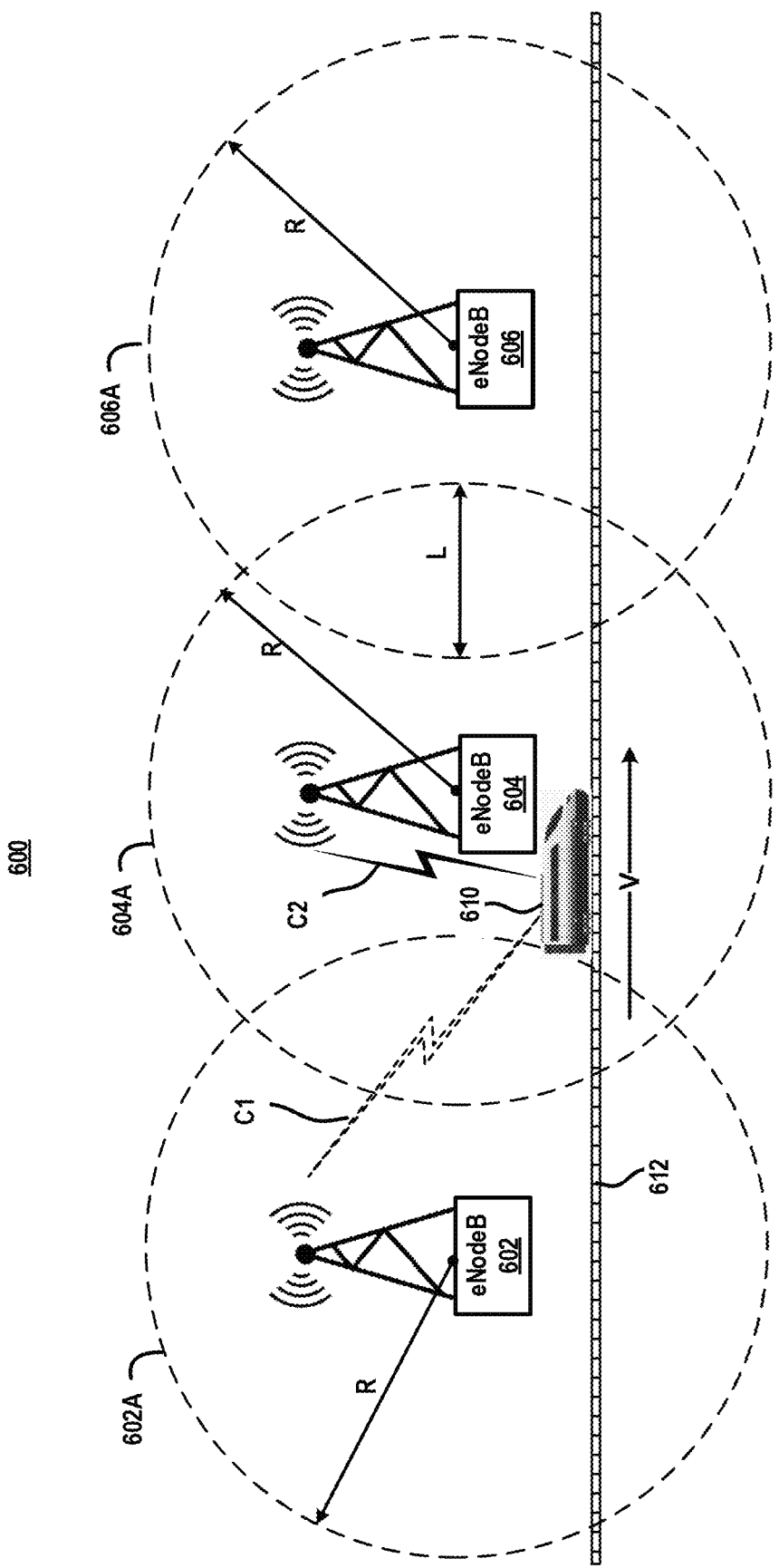

For example, FIGS. 6A and 6B schematically illustrate a method for sharing context among base station nodes for mobility management in a mobile communications network in the context of a fast-moving vehicle with wireless connectivity to the mobile communications network, according to an embodiment of the invention. In particular, FIGS. 6A and 6B schematically illustrate a mobile communications network 600 comprising at three neighboring base station nodes 602, 604, and 606 within a given tracking area of the mobile communications network 600. Each base station node 602, 604, and 606 has a respective radius R of coverage 602A, 604A, and 606A, wherein adjacent coverage areas overlap by a given distance L (or "overlap region").

FIGS. 6A and 6B schematically illustrate the application of mobility management methods according to embodiments of the invention in a "wireless connected train" domain, wherein a train 610 moves at a high velocity V along railway tracks 612 that extend through the coverage areas 602A, 604A, and 606A of the respective base station nodes 602, 604, and 606. In this example, it is assumed that the train 610 is equipped with one or more wireless UE elements that are wirelessly connected to the mobile communications network 600, or that passengers on board of the high-speed train have UE elements such as mobile phones, laptops, etc., which are wirelessly connected to the mobile communications network 600. The UE state sharing schemes as discussed herein enable a UE component of the high-speed train 610 to receive signals from adjacent base station nodes and obtain diversity gain when the UE component moves through overlapping areas of coverage between the adjacent base station nodes, so as to improve the quality of the received signal and provide reliable wireless communication between train UE components and the ground base station nodes 602, 604, and 606.

In particular, FIG. 6A illustrates an instance where the train moved from the coverage area 602A of the base station node 602 into the overlapping region of the coverage areas 602A and 604A of the base station nodes 602 and 604. In this instance, it is assumed that an active connection C1 was previously established between the UE of the train 610 and the serving base station 602 when the train 610 entered the coverage area 602A of the first base station 602. It is further assumed that the first base station 602 executed a state propagation process to share the PDCP context of the UE for the active connection C1 with the other base station nodes 604 and 606 within the tracking area.

As shown in FIG. 6A, when the train 610 enters the overlapping region of coverage between the first and second base station nodes 602 and 604, a new active connection C2 is established between the UE of the train 610 and the second base station 602 using the shared PDCP state of the first active connection C1 of the UE. In this instance, the two adjacent base station nodes 602 and 603 use the same frequency resource to communicate with the UE of the train 610, and maintain a cooperative relationship to concurrently communicate with the UE of the train 610 using both active connections C1 and C2 while the train 610 passes through the overlapping region of coverage between the first and second base station nodes 602 and 604. In this instance, the UE of the train 610 can receive signals from the two cooperative base station nodes 602 and 604. The UE of the train 610 can then decide when to release the active connection C1 with the first base station 602 according to measurement information reported by the UE of the moving train 610 and the RRM information of the target base station node 604, without interrupting data transmission in the user plane.

Next, as shown in FIG. 6B, as the train 610 moves out of the overlapping region of coverage between the first and second base station nodes 602 and 604 and enters into the coverage area 604A of the second base station node 602, the radio signal strength of the active connection C1 from the first base station node 602 gradually decrease as the train 610 moves further away from the first base station node 602. Once the radio signal strength of second base station node 604 is greater than the radio signal strength of the first base station node 602, the UE triggers a context switch to the active connection C2 of the second base station node 604 and releases the active connection C1 to the first base station node. In a conventional handover process, the signaling switch in the control plane is a "break-before-make" process. In contrast, with the PDCP state sharing schemes discussed herein, both base station nodes 602 and 604 transmit user-plane data and control-plane data to the UE of the train 610 with the same frequency resource without interrupting communications, thereby avoiding the interrupt latency caused by conventional hard handover methods in LTE systems. After the base station node switching process is performed, the UE releases the active connection C1 with the base station node 602 and the base station node 602 is removed from the cooperative set of base station nodes which share the PDCP context.

The exemplary mobility management techniques described here can also be readily applied to Cellular Vehicle-to-Everything (C-V2X) communications systems. As is known in the art, V2X communication is essential in providing real-time and highly reliable information flows to enable safe, efficient and environmentally-conscious transportation services, as well as pave the way to connected and automated driving (CAD). C-V2X is a technology developed in 3GPP and is designed to operate in two modes: (i) Device-to-Device mode; and (ii) Device-to-Network mode. The Device-to-Device mode includes Vehicle-to-Vehicle (V2V) (e.g., collision avoidance safety systems), Vehicle-to-(Roadway) Infrastructure (V2I) (e.g., traffic signal timing/priority), and Vehicle-to-Pedestrian (V2P) (safety alerts to pedestrians/bicyclists) direct communication without necessarily relying on network involvement for scheduling. The Device-to-Network mode includes Vehicle-to-Network (V2N) communication which utilizes traditional cellular links to enable cloud services to be part of the end-to-end solution by means of network slicing architecture for vertical industries. By implementing mobility management methods described herein, V2X can provide the necessary high performance wireless communication between networked elements, which is needed to support various use cases of today, e.g., intersection movement assist, emergency electronic brake light, forward collision warning, blind spot warning, lane change warning, etc., while being scalable to meet the requirements of use cases of tomorrow, e.g., Advanced Driver Assistance Systems (ADAS), where vehicles can cooperate, coordinate and share sensed information, and ultimately CAD.

It is to be understood that the above-described embodiments of the invention are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method, comprising: establishing a first active connection between a first base station node and a mobile device of an end user, wherein the first base station node is part of a radio access network of a mobile communications network; determining other base station nodes in the radio access network within a tracking area of the mobile device; in response to determining that at least a second base station node is within the tracking area of the mobile device, performing, by the first base station node, a state propagation process to share a state of the first active connection between the first base station node and the mobile device with at least the second base station node determined to be within the tracking area of the mobile device, wherein the shared state comprises a protocol context associated with a first active connection between the first base station node and the mobile device; in response to determining that a radio signal strength between the mobile device and the second base station node is greater than a radio signal strength between the mobile device and the first base station node, utilizing the shared state of the first active connection to (i) seamlessly establish a second active connection between the mobile device and the second base station node at least in part concurrently with the first active connection with the first base station node, (ii) enable both of the first and second base station nodes to share at least a portion of at least one communication channel, which is associated with the mobile device, to communicate with a core network, and to (iii) enable both of the first and second base station nodes to communicate user data and control data to the mobile device prior to release of the first active connection; and releasing the first active connection between the first base station node and the mobile device subsequent to establishing the second active connection.

2. The method of claim 1, wherein the protocol context comprises a Packet Data Convergence Protocol (PDCP) context associated with the first active connection between the first base station node and the mobile device.

3. The method of claim 2, wherein the PDCP context comprises a Virtual Instance ID, a Sector ID, a Cell Radio Network Temporary Identifier (C-RNTI), and a Logical Channel Identifier (LCI).

4. The method of claim 1, wherein performing the state propagation process comprises:

executing a second order sliding mode control process in the first base station node to determine system parameters of the mobile communications network which would achieve a minimal communication latency between a set of collaborating base station nodes to collaboratively share the state of the first active connection between the first base station node and the mobile device; and applying the determined system parameters of the mobile communications network to achieve the minimal communication latency for the set of collaborating base station nodes to collaboratively share the state of the first active connection between the first base station node and the mobile device.

5. The method of claim 4, wherein executing the second order sliding mode control process comprises:

determining a sliding surface in a system state space of the mobile communications system based on network latency; and performing a sliding phase process using the determined sliding surface to determine a finite time stability of the minimal communication latency.

6. The method of claim 5, wherein the sliding phase process is performed using a Lyapunov functional to determine the finite time stability of the minimal communication latency.

7. The method of claim 1, wherein the radio access network comprises an Evolved Universal Mobile Telecommunications System (UMTS) Terrestrial Radio Access Network (E-UTRAN), wherein the first and second base station nodes each comprise an Evolved NodeB, and wherein the mobile communications network comprises an Evolved Packet Core (EPC) network.

8. An article of manufacture comprising a processor-readable storage medium having stored therein program code of one or more software programs, wherein the program code is executable by one or more processors to implement a process comprising: establishing a first active connection between a first base station node and a mobile device of an end user, wherein the first base station node is part of a radio access network of a mobile communications network; determining other base station nodes in the radio access network within a tracking area of the mobile device; in response to determining that at least a second base station node is within the tracking area of the mobile device, performing, by the first base station node, a state propagation process to share a state of the first active connection between the first base station node and the mobile device with at least the second base station node determined to be within the tracking area of the mobile device, wherein the shared state comprises a protocol context associated with a first active connection between the first base station node and the mobile device; in response to determining that a radio signal strength between the mobile device and the second base station node is greater than a radio signal strength between the mobile device and the first base station node, utilizing the shared state of the first active connection to (i) seamlessly establish a second active connection between the mobile device and the second base station node at least in part concurrently with the first active connection with the first base station node, (ii) enable both of the first and second base station nodes to share at least a portion of at least one communication channel, which is associated with the mobile device, to communicate with a core network, and to (iii) enable both of the first and second base station nodes to communicate user data and control data to the mobile device prior to release of the first active connection; and releasing the first active connection between the first base station node and the mobile device subsequent to establishing the second active connection.

9. The article of manufacture of claim 8, wherein the protocol context comprises a Packet Data Convergence Protocol (PDCP) context associated with the first active connection between the first base station node and the mobile device.

10. The article of manufacture of claim 9, wherein the PDCP context comprises a Virtual Instance ID, a Sector ID, a Cell Radio Network Temporary Identifier (C-RNTI), and a Logical Channel Identifier (LCI).

11. The article of manufacture of claim 8, wherein performing the state propagation process comprises: executing a second order sliding mode control process in the first base station node to determine system parameters of the mobile communications network which would achieve a minimal communication latency between a set of collaborating base station nodes to collaboratively share the state of the first active connection between the first base station node and the mobile device; and applying the determined system parameters of the mobile communications network to achieve the minimal communication latency for the set of collaborating base station nodes to collaboratively share the state of the first active connection between the first base station node and the mobile device.

12. The article of manufacture of claim 11, wherein executing the second order sliding mode control process comprises:
determining a sliding surface in a system state space of the mobile communications system based on network latency; and
performing a sliding phase process using the determined sliding surface to determine a finite time stability of the minimal communication latency.

13. The article of manufacture of claim 12, wherein the sliding phase process is performed using a Lyapunov functional to determine the finite time stability of the minimal communication latency.

14. A mobile communications system, comprising: a first base station node within a radio access network of a mobile communications network; wherein the first base station node comprises a memory to store program instructions, and a processor system to execute the program instructions to instantiate a stack of protocol layers, wherein the protocol layers are configured to perform a process comprising: establishing a first active connection between the first base station node and a mobile device of an end user; determining other base station nodes in the radio access network within a tracking area of the mobile device; in response to determining that at least a second base station node is within the tracking area of the mobile device, performing, by the first base station node, a state propagation process to share a state of the first active connection between the first base station node and the mobile device with at least the second base station node determined to be within the tracking area of the mobile device, wherein the shared state comprises a protocol context associated with a first active connection between the first base station node and the mobile device; in response to determining that a radio signal strength between the mobile device and the second base station node is greater than a radio signal strength between the mobile device and the first base station node, utilizing the shared state of the first active connection to (i) seamlessly establish a second active connection between the mobile device and the second base station node at least in part concurrently with the first active connection with the first base station node, (ii) enable both of the first and second base station nodes to share at least a portion of at least one communication channel, which is associated with the mobile device, to communicate with a core network, and to (iii) enable both of the first and second base station nodes to communicate user data and control data to the mobile device prior to release of the first active connection; and
releasing the first active connection between the first base station node and the mobile device subsequent to establishing the second active connection.

15. The system of claim 14, wherein the protocol context comprises a Packet Data Convergence Protocol (PDCP) context associated with the first active connection between the first base station node and the mobile device.

16. The system of claim 15, wherein the PDCP context comprises a Virtual Instance ID, a Sector ID, a Cell Radio Network Temporary Identifier (C-RNTI), and a Logical Channel Identifier (LCI).

17. The system of claim 14, wherein in performing the state propagation process, the protocol layers are configured to perform a process which comprises: executing a second order sliding mode control process in the first base station node to determine system parameters of the mobile communications network which would achieve a minimal communication latency between a set of collaborating base station nodes to collaboratively share the state of the first active connection between the first base station node and the mobile device; and applying the determined system parameters of the mobile communications network to achieve the minimal communication latency for the set of collaborating base station nodes to collaboratively share the state of the first active connection between the first base station node and the mobile device.

18. The system of claim 17, wherein in executing the second order sliding mode control process, the protocol layers are configured to perform a process which comprises:
determining a sliding surface in a system state space of the mobile communications system based on network latency; and performing a sliding phase process using the determined sliding surface to determine a finite time stability of the minimal communication latency.

19. The system of claim 18, wherein in performing the sliding phase process, the protocol layers are configured to utilize a Lyapunov functional to determine the finite time stability of the minimal communication latency.

20. The system of claim 14, wherein the radio access network comprises an Evolved Universal Mobile Telecommunications System (UMTS) Terrestrial Radio Access Network (E-UTRAN), wherein the first and second base station nodes each comprise an Evolved NodeB, and wherein the mobile communications network comprises an Evolved Packet Core (EPC) network.

\* \* \* \* \*